(12) United States Patent
Zhang et al.

(10) Patent No.: US 12,003,459 B2
(45) Date of Patent: Jun. 4, 2024

(54) METHOD AND APPARATUS FOR TRANSMISSION CONFIGURATION INDICATOR (TCI) STATE ACTIVATION AND DEACTIVATION

(71) Applicant: ZTE Corporation, Shenzhen (CN)

(72) Inventors: Shujuan Zhang, Shenzhen (CN); Zhaohua Lu, Shenzhen (CN); Yu Ngok Li, Shenzhen (CN); Chuangxin Jiang, Shenzhen (CN); Zhen He, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 412 days.

(21) Appl. No.: 17/401,884

(22) Filed: Aug. 13, 2021

(65) Prior Publication Data

US 2022/0038244 A1  Feb. 3, 2022

Related U.S. Application Data

(63) Continuation of application No. PCT/CN2020/075604, filed on Feb. 17, 2020.

(30) Foreign Application Priority Data

Feb. 15, 2019 (CN) .......................... 201910117676.1

(51) Int. Cl.
*H04L 5/00* (2006.01)
*H04L 1/1812* (2023.01)
(Continued)

(52) U.S. Cl.
CPC .......... *H04L 5/0055* (2013.01); *H04L 1/1812* (2013.01); *H04L 5/0053* (2013.01);
(Continued)

(58) Field of Classification Search
CPC ... H04L 5/0055; H04L 1/1812; H04L 5/0053; H04W 72/20; H04W 72/23; H04W 72/0446

See application file for complete search history.

(56) References Cited

U.S. PATENT DOCUMENTS

| | | | | |
|---|---|---|---|---|
| 11,528,734 | B2 * | 12/2022 | Li | ..................... H04W 72/0446 |
| 11,546,867 | B2 * | 1/2023 | Li | ......................... H04W 72/53 |
| 11,723,049 | B2 * | 8/2023 | Xi | ......................... H04L 5/0051 |
| | | | | 370/329 |

FOREIGN PATENT DOCUMENTS

| | | |
|---|---|---|
| CN | 103595512 A | 2/2014 |
| CN | 108307505 | 7/2018 |

(Continued)

OTHER PUBLICATIONS

Australian Examination Report No. 1 regarding 2020223272 dated Feb. 27, 2023, 3 pages.

(Continued)

*Primary Examiner* — Chandrahas B Patel
(74) *Attorney, Agent, or Firm* — Crowell & Moring LLP

(57) ABSTRACT

Provided are an information transmission method and apparatus. The method includes acquiring, according to one of a second type of information or a third type of information, the other one of the second type of information or the third type of information; or transmitting one piece of first signaling information including the second type of information and the third type of information. The second type of information includes at least one of a downlink control channel resource group, an uplink control channel resource group, a process number set, a transmission configuration indicator (TCI) state group, a spatial relation information group or an antenna group.

9 Claims, 12 Drawing Sheets

(51) Int. Cl.
*H04W 72/0446* (2023.01)
*H04W 72/20* (2023.01)
*H04W 72/23* (2023.01)

(52) U.S. Cl.
CPC ....... *H04W 72/0446* (2013.01); *H04W 72/20* (2023.01); *H04W 72/23* (2023.01)

(56) References Cited

FOREIGN PATENT DOCUMENTS

| | | |
|---|---|---|
| CN | 108307505 A | 7/2018 |
| CN | 108633021 A | 10/2018 |
| CN | 110536435 A | 12/2019 |
| TW | 201841529 A | 11/2018 |
| WO | WO2013186594 A | 12/2013 |

OTHER PUBLICATIONS

International Search Report with English translation and Written Opinion regarding PCT/CN2020/075604 dated May 26, 2020, 13 pgs.
Communication pursuant to Rule 63(1) EPC regarding Application No. 20 755 590.5 dated Oct. 13, 2022, 6 pages.
Japanese Office Action with English translation regarding 2021-547417 dated May 1, 2023.
Vivo, "Discussion on multi PDCCH based multi TRP transmission," 3GPP TSG RAN WG1 adhoc_NR_AH_1901 R1-1900137, Retrieved from the Internet: http://www.3gpp.org/ftp/tsg_ran/WG1_RL1/TSGR1_AH/NR_AH_1901/Docs/R1-1900137.zip>, Jan. 12, 2019, pp. 1-15.
Spreadtrum Communications, "Clarification on BWP ID in MAC CE," 3GPP TSG RAN WG2 #104 R2-1818809, Retrieved from the Internet: http://www.3gpp.org/ftp/tsg_ran/WG2_RL2/TSGR2_104/Docs/R21818809.zip>, Nov. 29, 2018, pp. 1-12.
Qualcomm Incorporated, "Multi-TRP Enhancements," 3GPP TSG RAN WG1 adhoc_NR_AH_1901 R1-1900905, Retrieved from the Internet: http://www.3gpp.org/ftp/tsg_ran/WG1_RL1/TSGR1_AH/NR_AH_1901/Docs/R1-1900905.zip>, Jan. 12, 2019,pp. 1-26.
Huawei, HiSilicon, "Discussion on SPS HARQ-ACK bit handling in case of dynamic codebook configuration for eCA," 3GPP TSG-RAN WG1#84b R1-162105, Retrieved from the Internet: http://www.3gpp.org/ftp/tsg_ran/WG1_RL1/TSGR1_84b/Docs/R1162105.zip>,Apr. 2, 2016, pp. 1-5.
Ericsson, "Clarification for handling TCI state ID," 3GPP TSG RAN WG2 #105, R2-1901508, retrieved from the Internet: http://www.3gpp.org/ftp/tsg_ran/WG2_RL2/TSGR2_105/Docs/R2-1901508.zip, Feb. 14, 2019, pp. 1-5.
Indian Office Action regarding 202117039546 dated Sep. 23, 2022, 6 pages.
Extended European Search Report regarding EP 20 75 5590 dated Feb. 7, 2023, 15 pages.
Ericsson, "Remaining details of beam management," 3GPP DRAFT, R1-1804974, 3rd Generation Partnership Project (3GPP), Mobile Competence Center, Sophia-Antipolis Cedex, France, vol. RAN WG1, no. Sanya, China, Retrieved from the Internet: http://www.3gpp.org/ftp/tsg%5Fran/WG1%5FRL1/TSGR1%5F92b/Docs/ Apr. 7, 2018, pp. 1-13.
NTT DOCOMO et al., "Discussion on CORESET0," 3GPP Draft; RI-1813934 Discussion on CORESET0_REV04, 3rd Generation Partnership Project (3GPP), Mobile Competence Centre, 650, Route Des Lucioles; F-06921 Sophia-Antipolis Cedex; France, vol. RAN WGI, no. Spokane, USA, Retrieved from the Internet: http://www.3gpp.org/ftp/tsg%5Fran/WG1%5FRL1/TSGR1%5F95/Docs/RI%2DI813934%2Ezip, Nov. 13, 2018.
Ericsson et al., "Corrections to PxxCH configurations", 3GPP Draft; R2-1807994 Corrections to PxxCH Configuration in 38331, $3^{rd}$ Generation Partnership Project (3GPP), Mobile Competence Centre; 650, Route Des Lucioles; F-06921 Sophia-Antipolis Cedex, France, vol. RAN WG2, no. Busan, Republic of Korea; May 21, 2018-May 25, 2018, Retrieved from the Internet: http://www.3gpp.org/ftp/Meetings%5F3GPP%5FSYNC/RAN2/Docs/, May 20, 2018.
CMCC, "Discussion on remaining issues for unicast PDCCH in CORESET#0," 3GPP Draft; RI-1806361, 3rd Generation Partnership Project (3GPP), Mobile Competence Centre; 650, Route Des Lucioles; F-06921 Sophia-Antipolis Cedex, France vol. RAN WGI, no. Busan, Korea; May 21, 2018-May 25, 2018, Retrieved from the Internet: http://www.3gpp.org/ftp/Meetings%5F3GPP%5FSYNC/RAN1/Docs/, May 20, 2018.

\* cited by examiner

METHOD AND APPARATUS FOR TRANSMISSION CONFIGURATION INDICATOR (TCI) STATE ACTIVATION AND DEACTIVATION

CROSS-REFERENCE TO RELATED APPLICATION

This application is a continuation application of PCT Patent Application No. PCT/CN2020/075604, filed on Feb. 17, 2020, which claims priority to Chinese Patent Application No. 201910117676.1 filed with the China National Intellectual Property Administration on Feb. 15, 2019, both of which are incorporated herein by reference in their entireties.

TECHNICAL FIELD

The present application relates to, but is not limited to, the communication technology, for example, an information transmission method and apparatus.

BACKGROUND

The related new radio access technology protocol supports dynamic switching of transmission reception points (TRPs), thereby enabling multiple TRPs to serve one terminal in a time division manner and thus improving the spectral efficiency or link robustness. However, the NR protocol does not allow the multiple TRPs to serve one terminal simultaneously in the same time-domain resource. To increase the flexibility of base station deployment and reduce the link delay, it is needed to consider the mechanism in which multiple TRPs can serve one terminal simultaneously in the same time-domain resource or the scenario where multiple TRPs can schedule the same user independently of each other in the absence of an ideal backhaul. The manner in which multiple TRPs serve the same user not only increases the link robustness, but also improves the spectral efficiency. However, how to enable the system in which multiple TRPs serve the same user to operate effectively is the main problem considered herein.

For example, in the related NR protocol, a maximum of eight logical channels and eight logical channel groups (LCGs) are configured for one terminal. One logical channel corresponds to one scheduling request (SR) configuration, that is, one SR identifier (SRID). One SRID can correspond to multiple physical uplink control channel (PUCCH) resources in multiple bandwidth parts (BWPs)/component carriers (CCs), but can correspond to only one PUCCH resource in one BWP. One LCG can correspond to only one buffer state at one instant. That is, one LCG can correspond to only one buffer size at one instant to feed back the amount of new data that corresponds to the LCG and is to be transmitted.

When one user equipment (UE) is served by two TRPs, for example, when one terminal can send a physical uplink shared channel (PUSCH) to two TRPs in one time unit or in the same time-domain resource, especially when there is no ideal backhaul between the two TRPs, the related SR mechanism and buffer state sending method need to be enhanced such that the terminal communicates with the two TRPs through two uplinks in one BWP.

On the other hand, it is also a problem to be considered herein as how to reduce the signaling overhead and increase the parameter flexibility when multiple TRPs schedule one user independently of each other.

In a second aspect, it is also a problem to be considered herein as how to enhance the feedback of channel state information (CSI) such that both the link robustness and the spectral efficiency of the system are improved when two TRPs serve one terminal, more exactly, when two TRPs send a PDSCH to the terminal and send the same data information.

In a third aspect, it is also a problem to be considered herein as how to reduce signal interference between two TRPs that operate independently of each other in one cell, where there is no ideal backhaul between the two TRPs, and the two TRPs share one physical cell ID but can schedule a user independently of each other.

SUMMARY

Embodiments of the present application provide an information transmission method and apparatus capable of sending scheduling request information or buffer state information when at least one TRP serves a terminal, thereby communicating with at least one TRP through at least one uplink.

An embodiment of the present application provides an information transmission method. The method includes determining a first type of information; and sending at least one of scheduling request (SR) information or buffer state information according to the first type of information.

The first type of information includes at least one of N scheduling request resources of at least one of one logical channel or one logical channel group (LCG) in one bandwidth part (BWP); L SR configurations corresponding to the at least one of the one logical channel or the one LCG; M buffer states corresponding to the at least one of the one logical channel or the one LCG; X SR configuration groups corresponding to one serving cell group; or Y LCGs corresponding to the one serving cell group.

N, L, X, Y and M are each a positive integer greater than or equal to 1.

An embodiment of the present application provides an information transmission method. The method includes sending configuration information for determining a first type of information.

The first type of information includes at least one of N scheduling request resources of at least one of one logical channel or one logical channel group (LCG) in one bandwidth part (BWP); L SR configurations corresponding to the at least one of the one logical channel or the one LCG; M buffer states corresponding to the at least one of the one logical channel or the one LCG; X SR configuration groups corresponding to one serving cell group; or Y LCGs corresponding to the one serving cell group.

N, L, X, Y and M are each a positive integer greater than or equal to 1.

An embodiment of the present application provides an information transmission apparatus. The apparatus includes a first determination module and an information sending module.

The first determination module is configured to determine a first type of information.

The information sending module is configured to send at least one of scheduling request (SR) information or buffer state information according to the first type of information.

The first type of information includes at least one of N scheduling request resources of at least one of one logical channel or one logical channel group (LCG) in one bandwidth part (BWP); L SR configurations corresponding to the at least one of the one logical channel or the one LCG; M buffer states corresponding to the at least one of the one logical channel or the one LCG; X SR configuration groups corresponding to one serving cell group; or Y LCGs corresponding to the one serving cell group.

N, L, X, Y and M are each a positive integer greater than or equal to 1.

An embodiment of the present application provides an information transmission apparatus. The apparatus includes a configuration information sending module.

The configuration information sending module is configured to send configuration information for determining a first type of information.

The first type of information includes at least one of N scheduling request resources of at least one of one logical channel or one logical channel group (LCG) in one bandwidth part (BWP); L SR configurations corresponding to the at least one of the one logical channel or the one LCG; M buffer states corresponding to the at least one of the one logical channel or the one LCG; X SR configuration groups corresponding to one serving cell group; or Y LCGs corresponding to the one serving cell group.

N, L, X, Y and M are each a positive integer greater than or equal to 1.

An embodiment of the present application provides an information transmission apparatus. The apparatus includes a processor and a computer-readable storage medium. The computer-readable storage medium stores instructions which, when executed by the processor, cause the processor to perform any preceding information transmission method.

An embodiment of the present application provides a computer-readable storage medium. The computer-readable storage medium stores a computer program which, when executed by a processor, causes the processor to perform the steps of any preceding information transmission method.

The method of this embodiment of the present application includes determining a first type of information; and sending at least one of scheduling request (SR) information or buffer state information according to the first type of information. The first type of information includes at least one of N scheduling request resources of at least one of one logical channel or one logical channel group (LCG) in one bandwidth part (BWP); L SR configurations corresponding to the at least one of the one logical channel or the one LCG; M buffer states corresponding to the at least one of the one logical channel or the one LCG; X SR configuration groups corresponding to one serving cell group; or Y LCGs corresponding to the one serving cell group. N, L, X, Y and M are each a positive integer greater than or equal to 1. In this embodiment of the present application, the SR information or buffer state information is sent based on the first type of information so that communication with at least one TRP through at least one uplink is achieved.

The information determination method of this embodiment can improve the parameter flexibility and the system performance.

An embodiment of the present application provides an information determination method. The method includes at least one of acquiring, according to one of a second type of information or a third type of information, the other one of the second type of information or the third type of information; or transmitting one piece of first signaling information including the second type of information and the third type of information.

The second type of information includes at least one of a downlink control channel resource group, an uplink control channel resource group, a process number set, a transmission configuration indicator (TCI) state group, a spatial relation information group or an antenna group.

The third type of information includes at least one of the maximum number of data channels or code words (CWs) transmitted in one time-domain symbol of one bandwidth part (BWP) or component carrier (CC); the maximum number of data channels or CWs having intersecting time-domain resources in the one BWP or CC; a hybrid automatic repeat request acknowledgement (HARQ-ACK) feedback codebook; whether at least two of the HARQ-ACK, a scheduling request (SR) and channel state information (CSI) are fed back in one uplink channel; the maximum number of semi-persistent scheduling physical downlink shared channels (SPS PDSCHs) or CWs received in the one time-domain symbol of the one BWP or CC; the maximum number of grant-free physical uplink shared channels (PUSCHs) or CWs sent in the one time-domain symbol of the one BWP or CC; a table for mapping between a predetermined bit field value in downlink control information (DCI) and content indicated by the predetermined bit field value; spatial relation information; quasi co-location reference signal information; the number of times of beam switching; or activation or deactivation information of a semi-persistent signal.

An embodiment of the present application provides an information determination apparatus. The apparatus includes a second determination module configured to perform at least one of acquiring, according to one of a second type of information or a third type of information, the other one of the second type of information or the third type of information; or transmitting one piece of first signaling information including the second type of information and the third type of information.

The second type of information includes at least one of a downlink control channel resource group, an uplink control channel resource group, a process number set, a transmission configuration indicator (TCI) state group, a spatial relation information group or an antenna group.

The third type of information includes at least one of the maximum number of data channels or code words (CWs) transmitted in one time-domain symbol of one bandwidth part (BWP) or component carrier (CC); the maximum number of data channels or CWs having intersecting time-domain resources in the one BWP or CC; a hybrid automatic repeat request acknowledgement (HARQ-ACK) feedback codebook; whether at least two of the HARQ-ACK, a scheduling request (SR) and channel state information (CSI) are fed back in one uplink channel; the maximum number of semi-persistent scheduling physical downlink shared channels (SPS PDSCHs) or CWs received in the one time-domain symbol of the one BWP or CC; the maximum number of grant-free physical uplink shared channels (PUSCHs) or CWs sent in the one time-domain symbol of the one BWP or CC; a table for mapping between a predetermined bit field value in downlink control information (DCI) and content indicated by the predetermined bit field value; spatial relation information; quasi co-location reference signal information; the number of times of beam switching; or activation or deactivation information of a semi-persistent signal.

An embodiment of the present application provides an information determination apparatus. The apparatus includes a processor and a computer-readable storage medium. The computer-readable storage medium stores instructions which, when executed by the processor, cause the processor to perform any preceding information determination method.

An embodiment of the present application provides a computer-readable storage medium. The computer-readable storage medium stores a computer program which, when executed by a processor, causes the processor to perform the steps of any preceding information determination method.

The method of this embodiment of the present application includes at least one of acquiring, according to one of a second type of information or a third type of information, the other one of the second type of information or the third type of information; or transmitting one piece of first signaling information including the second type of information and the third type of information. In this embodiment of the present application, in a multi-TRP transmission scenario, an association is established between the first type of information and the second type of information. In this embodiment of the present application, one type of information is used in acquiring the other type of information, thereby reducing the signaling overhead and/or enabling different pieces of the second type of information elements to correspond to different third types of information elements, that is, enabling different TRPs to correspond to different third types of information, thus improving the parameter flexibility and the system performance.

An embodiment of the present application provides a feedback information sending method. The method enables feedback information to be sent when at least one TRP serves a terminal, thereby improving both the link robustness and the spectral efficiency of the system.

The feedback information sending method of this embodiment of the present application includes acquiring channel quality indicator (CQI) information according to at least one of a repeated transmission factor R or a repeated transmission mode; and sending the CQI information.

An embodiment of the present application provides a feedback information sending apparatus. The apparatus includes an acquisition module and a CQI information sending module.

- an acquisition module configured to acquire channel quality indicator (CQI) information according to at least one of a repeated transmission factor R or a repeated transmission mode; and
- a CQI information sending module configured to send the CQI information.

An embodiment of the present application provides a feedback information sending apparatus. The apparatus includes a processor and a computer-readable storage medium. The computer-readable storage medium stores instructions which, when executed by the processor, cause the processor to perform any preceding feedback information sending method.

An embodiment of the present application provides a computer-readable storage medium. The computer-readable storage medium stores a computer program which, when executed by a processor, causes the processor to perform the steps of any preceding feedback information sending method.

The method of this embodiment of the present application includes acquiring channel quality indicator (CQI) information according to at least one of a repeated transmission factor R or a repeated transmission mode; and sending the CQI information. In this embodiment of the present application, the CQI information is acquired according to at least one of the repeated transmission factor or the repeated transmission mode. This transmission scheme is closer to the actual PDSCH transmission scheme, thereby enabling the CQI to be fed back more accurately, improving the spectral efficiency and reducing interference. Moreover, the implementation complexity of a base station is reduced. This is because the base station does not need to calculate the CQI actually used in PDSCH transmission based on the CQI fed back by a terminal, and in this calculation process, different implementation algorithms between the base station and the terminal lead to inaccurate calculation.

An embodiment of the present application provides an information determination method that enables multiple TRPs to schedule a user independently of each other.

The information determination method of this embodiment of the present application includes at least one of dividing synchronization signal blocks (SSBs) corresponding to one physical cell identifier (ID) into E SSB groups, where E is a positive integer; or acquiring, according to an SSB group index, at least one of the following information: an uplink control channel resource where hybrid automatic repeat request acknowledgement (HARQ-ACK) information is located, a physical random access channel (PRACH) resource, or timing advance (TA) information.

An embodiment of the present application provides an information determination apparatus. The apparatus includes a processor and a computer-readable storage medium. The computer-readable storage medium stores instructions which, when executed by the processor, cause the processor to perform any preceding information determination method.

An embodiment of the present application provides a computer-readable storage medium. The computer-readable storage medium stores a computer program which, when executed by a processor, causes the processor to perform the steps of any preceding information determination method.

The preceding embodiment of the present application enables independent scheduling of the user based on the SSB group index.

An embodiment of the present application provides a monitoring occasion determination method. The method includes determining, according to a synchronization signal block (SSB) index corresponding to at least one quasi co-location reference signal set configured or activated for a control resource set CORESET0, a monitoring occasion of a downlink control channel scrambled by a cell radio network temporary identifier (C-RNTI) in CORESET0.

An embodiment of the present application provides a monitoring occasion determination apparatus. The apparatus includes a monitoring occasion determination module configured to determine, according to a synchronization signal block (SSB) index corresponding to at least one quasi co-location reference signal set configured or activated for a control resource set CORESET0, a monitoring occasion of a downlink control channel scrambled by a cell radio network temporary identifier (C-RNTI) in CORESET0.

An embodiment of the present application provides a monitoring occasion determination apparatus. The apparatus includes a processor and a computer-readable storage medium. The computer-readable storage medium stores instructions which, when executed by the processor, cause the processor to perform any preceding monitoring occasion determination method.

An embodiment of the present application provides a computer-readable storage medium. The computer-readable storage medium stores a computer program which, when executed by a processor, causes the processor to perform the steps of any preceding monitoring occasion determination method.

BRIEF DESCRIPTION OF DRAWINGS

The drawings are intended to provide a further understanding of solutions of embodiments of the present application, constitute a part of the description, illustrate solutions of embodiments of the present application in conjunction with embodiments of the present application, and do not limit solutions of embodiments of the present application.

DETAILED DESCRIPTION

Figure 1:
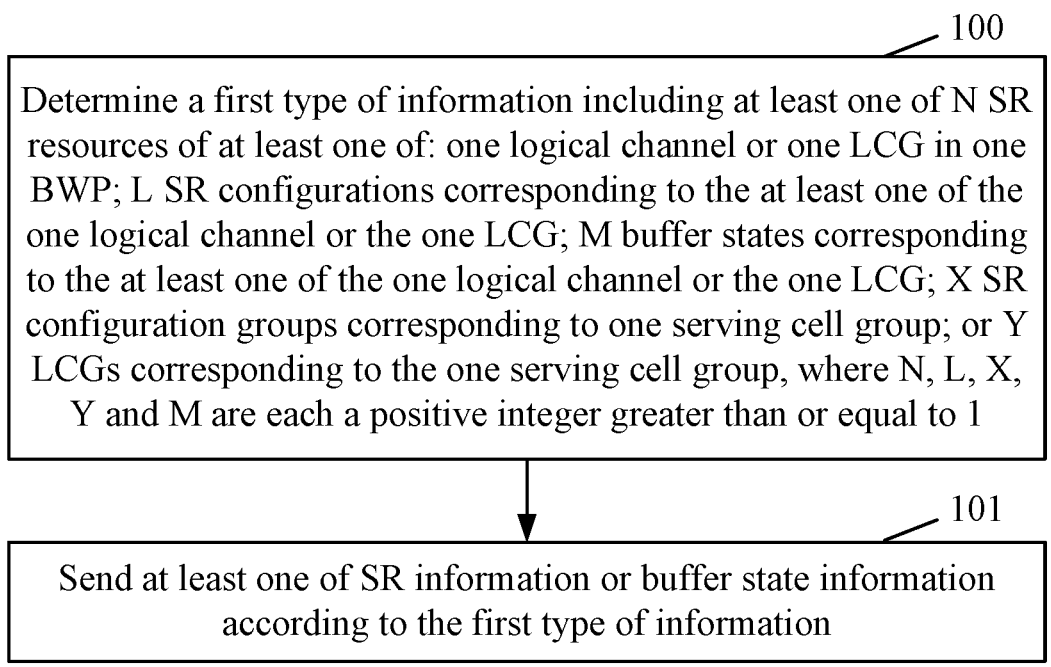
FIG. 1 is a flowchart of an information transmission method according to an embodiment of the present application.

Embodiments of the present application are described hereinafter in detail with reference to drawings. It is to be noted that if not in collision, the embodiments described herein and the features thereof may be combined with each other.

The steps illustrated in the flowcharts among the drawings may be performed by, for example, a computer system capable of executing a set of computer-executable instructions. Moreover, although logical sequences are illustrated in the flowcharts, the illustrated or described steps may be performed in sequences different from those described herein in some cases.

In the embodiments below, the spatial relation information of the uplink reference signal 1 indicates one reference signal 2. When the reference signal 2 is an uplink reference signal, the spatial transmission filter of the uplink reference signal 1 is acquired according to the spatial transmission filter of the reference signal 2. Alternatively, when the reference signal 2 is a downlink reference signal, the spatial transmission filter of the uplink reference signal 1 is acquired according to the spatial reception filter of the reference signal 2. The spatial filter 1 is acquired according to the spatial filter 2 in the following manner: The two are the same, or the difference between the center angle of the spatial filter 1 and the center angle of the spatial filter 2 is within a certain range.

In the embodiments below, the downlink control channel includes a physical downlink control channel (PDCCH), and the downlink data channel includes a physical downlink shared channel (PDSCH).

In the embodiments below, the downlink control channel resource includes at least one of a downlink control channel time-domain resource, a downlink control channel frequency-domain resource or a downlink control channel spatial-domain resource. For example, the downlink control channel resource includes one of a control resource set (CORESET), a search space set, a search space corresponding to an aggregation degree, a time-domain occasion of the search space set, a frequency-domain resource set of the CORESET, a control channel demodulation reference signal port group, or a control channel resource corresponding to a quasi co-location reference signal set. One search space set includes one or more search spaces. Each search space corresponds to one aggregation degree. One quasi co-location reference signal set corresponds to one transmission configuration indicator (TCI) state. Demodulation reference signals in one control channel demodulation reference signal port group satisfy the quasi co-location relationship. Demodulation reference signals in different control channel demodulation reference signal port groups do not satisfy the quasi co-location relationship. Different quasi co-location reference signal sets represent different control channel spatial-domain resources.

In the embodiments below, one downlink control channel resource group includes one or more downlink control channel resources. Alternatively, each downlink control channel resource group includes only one downlink control channel resource. In this case, the downlink control channel resource group may also be referred to as a downlink control channel resource.

Further, different downlink control channel resource groups correspond to different transmission parameters of channels and/or signals. That is, different downlink control channel resources correspond to different transmission parameters of PDSCH/PUSCH/PUCCH/CSI-RS/SRS. These downlink control channel resource groups belong to one BWP.

In the embodiments below, the SR information may also be referred to as buffer state information. That is, the SR information is used for indicating whether the LCG or buffer corresponding to the SRID has new to-be-sent data. That is, the SR information is used for requesting a PUSCH resource for sending the new data. For example, the positive SR indicates that the LCG or buffer corresponding to the SRID has new to-be-sent data, and the negative SR indicates that the LCG or buffer corresponding to the SRID has no new to-be-sent data.

In the embodiments below, the buffer state report includes the buffer size of an LCG. The buffer size is the packet size of the to-be-sent data corresponding to the LCG.

In the embodiments below, the association between two parameters includes at least one of the following: The value of one parameter is obtained according to the value of another parameter, the value range of one parameter is obtained according to the value or value range of another parameter, some value combinations of the two parameters cannot occur simultaneously, the parameter 2 corresponding to the parameter 1 is configured in the configuration information of the parameter 1, or the correspondence between the two parameters is determined by signaling information and/or an agreed rule.

In the embodiments below, one buffer corresponds to one piece of SR information and/or one piece of buffer state information.

In the embodiments below, one TCI state includes one quasi co-location reference signal set; one quasi co-location reference signal set includes one or more quasi co-location reference signals; different quasi co-location reference signals are associated with different quasi co-location parameters; and quasi co-location reference signal indication information of one target signal is configured as one TCI state, indicating that the target signal and a quasi co-location reference signal comprised in the TCI state satisfy the quasi co-location relationship with respect to the quasi co-location parameter associated with the quasi co-location reference signal.

Referring to FIG. 1, an embodiment of the present application provides an information transmission method. The method includes the steps below.

In step 100, a first type of information is determined. The first type of information includes at least one of the following: N scheduling request resources of at least one of one logical channel or one LCG in one BWP; L SR configurations corresponding to the at least one of the one logical channel or the one LCG; M buffer states corresponding to the at least one of the one logical channel or the one LCG; X SR configuration groups corresponding to one serving cell group; or Y LCGs corresponding to the one serving cell group. N, L, X, Y and M are each a positive integer greater than or equal to 1.

In this embodiment of the present application, SR configurations are in one-to-one correspondence with SR identifiers (SRIDs).

In this embodiment of the present application, the first type of information is determined in at least one of the following manners: Configuration information is received, and the first type of information is determined according to the configuration information, where the configuration information may include the first type of information or include other information for indicating the first type of information; or the first type of information is determined according to a predetermined rule, for example, in a predetermined manner.

In this embodiment of the present application, the N scheduling request resources satisfy at least one of the features below.

The N scheduling request resources correspond to one SR configuration, or the N scheduling request resources correspond to the L SR configurations.

The N scheduling request resources include N reference signal port groups of one uplink control channel resource.

The N scheduling request resources include N time-domain resource groups of the one uplink control channel resource.

The N scheduling request resources include N frequency-domain resource groups of the one uplink control channel resource.

The N scheduling request resources include N time-frequency resource groups of the one uplink control channel resource.

The N scheduling request resources correspond to N pieces of spatial relation information of one reference signal port group of the one uplink control channel resource.

The N scheduling request resources include N uplink control channel resources.

The N scheduling request resources correspond to N pieces of spatial relation information.

An intersection between time-domain resources and/or an intersection between frequency-domain resources occupied by the N scheduling request resources is empty.

The N scheduling request resources fall within one time unit. When the N scheduling request resources are periodic resources, that the N scheduling request resources fall within one time unit means that the N scheduling request resources fall within one time unit in one period.

The N scheduling request resources correspond to N pieces of period information.

The N scheduling request resources include the same or different scheduling request information.

The scheduling request information includes a positive SR and a negative SR.

The N scheduling request resources correspond to one or more buffers. That is, data in one logical channel or one LCG is allocated to one or more buffers and then transmitted to different TRPs.

The buffer is used for buffering new to-be-sent data.

The N scheduling request resources are triggered simultaneously or separately. Here "triggered" means "sent". "Sent simultaneously" means "sent in the same period", but does not mean that the N scheduling request resources occupy the same time-domain resources. "Sent separately" means that the N scheduling request resources are determined to be triggered/sent or not according to their respective buffer states.

In the above embodiment, N is greater than 1.

In this embodiment of the present application, the method satisfies at least one of the following features: Different control channel resources of the N uplink control channel resources belong to different uplink control channel resource groups; reference signal ports in one reference signal port group of the N reference signal port groups correspond to one piece of the spatial relation information; or N is equal to L.

In this embodiment of the present application, the scheduling request resource includes at least one of an uplink control channel resource, a reference signal port of one uplink control channel resource, a time-domain resource group of the one uplink control channel resource, a frequency-domain resource group of the one uplink control channel resource or a time-frequency resource group of the one uplink control channel resource.

In this embodiment of the present application, the method satisfies at least one of the following features: N is greater than or equal to L; N is greater than or equal to M; L is greater than or equal to M; X is equal to Y; at least one of N, L, M, X or Y is associated with the number of uplink control channel resource groups; the at least one of N, L, M, X or Y is associated with the number of downlink control channel resource groups; the at least one of N, L, M, X or Y is associated with the number of TCI state groups; the at least one of N, L, M, X or Y is associated with the number of spatial relation information groups; or the sum of at least two of N, L, M, X and Y is greater than 2.

In this embodiment of the present application, the uplink control channel includes a PUCCH, and the uplink data channel includes a PUSCH.

In step 101, at least one of scheduling request (SR) information or buffer state information is sent according to the first type of information.

In this embodiment of the present application, the buffer state information includes buffer state report information.

In this embodiment of the present application, at least one of the SR information or the buffer state information is sent according to the first type of information in at least one of the following manners: The SR information is sent according to the N scheduling request resources; the SR information is sent according to the L SR configurations; M pieces of buffer state information corresponding to the at least one of the one logical channel or the one LCG are sent according to the M buffer states, where M is a positive integer greater than or equal to 1; the SR information is sent according to the X SR configuration groups; or the at least one of the SR information or the buffer state information is sent according to the Y LCGs. The SR information is sent according to the N scheduling request resources in at least one of the manners below.

At least one SR resource is selected from the N scheduling request resources, and the SR information is sent on the selected at least one SR resource. The selected at least one SR resource corresponds to at least one TRP. That is, the SR information is sent to different TRPs on the selected different SR resources.

The SR information is sent on the N scheduling request resources. The N SR resources correspond to at least one TRP. That is, the SR information is sent to different TRPs on different SR resources.

Positive SR information is sent on at least one SR resource corresponding to the positive SR information among the N SR resources.

Moreover/alternatively, the SR information is sent according to the L SR configurations in one of the manners below.

At least one SR resource is selected from SR resources corresponding to the L SR configurations, and the SR information is sent on the selected at least one SR resource. The selected at least one SR resource corresponds to at least one TRP. That is, the SR information is sent to different TRPs on the selected different SR resources.

The SR information is sent on the SR resources corresponding to the L SR configurations. The SR resources corresponding to the L SR configurations correspond to at least one TRP. That is, the SR information is sent to different TRPs on different SR resources.

Positive SR information is sent on an SR resource corresponding to at least one SR configuration corresponding to the positive SR information among the L SR configurations.

The M pieces of buffer state information corresponding to the at least one of the one logical channel or the one LCG are sent according to the M buffer states in at least one of the manners below.

The M pieces of buffer state information are sent in an M-type uplink data channel.

The M pieces of buffer state information are sent in one time unit.

The M pieces of buffer state information are sent in M medium access control-control element (MAC-CE) commands.

The M pieces of buffer state information correspond to buffer states of M buffers of the one LCG.

Buffer sizes included in the M pieces of buffer state information are independent. Here "independent" means that the buffer sizes are not associated with each other and may be the same or different.

The sum of the buffer sizes included in the M pieces of buffer state information is equal to the buffer size of the one LCG.

The buffer size of the one LCG is divided into M buffer sizes, and the M buffer sizes are sent in the M pieces of buffer state information.

M is greater than 1.

The M pieces of buffer state information correspond to at least one TRP. That is, the M pieces of buffer state information are sent to different TRPs separately.

The SR information is sent according to the X SR configuration groups in at least one of the manners below.

Each SR configuration group of the X SR configuration groups corresponds to one set of first-type parameters.

Different SR configuration groups of the X SR configuration groups correspond to different first-type parameters.

SR information in one SR configuration group of the X SR configuration groups is fed back in one uplink control channel resource or uplink data channel. The SR information in the SR configuration group is SR information corresponding to a logical channel corresponding to an SR configuration in the SR configuration group.

SR information in the different SR configuration groups is not able to be fed back in the one uplink control channel resource or uplink data channel.

The SR information in the different SR configuration groups is fed back in different uplink control channel resources or uplink data channels.

In the case where the SR information is sent in an uplink control channel using a first predetermined format, the each SR configuration group corresponds to one SR feedback bit. The first predetermined format includes any one of format 0 or format 1.

In the case where the SR information is sent in an uplink control channel using a second predetermined format or in an uplink data channel, the ith SR configuration group of the X SR configuration groups corresponds to $\lceil \log_2(K_i+1) \rceil$ feedback bits. i=0, 1, . . . , X−1. $K_i$ denotes the number of SR configurations in the ith SR configuration group. The second predetermined format includes any one of format 2, format 3 or format 4.

X is greater than 1.

The first-type parameters include at least one of an uplink control channel resource group, a type of uplink data channel, a downlink control channel resource group, SR information, a transmission configuration indicator (TCI) state group or a spatial relation information group.

The X SR configuration groups correspond to at least one TRP. That is, the SR information is sent to different TRPs through different SR configuration groups.

The at least one of the SR information or the buffer state information is sent according to the Y LCGs in at least one of the manners below.

Each LCG of the Y LCGs corresponds to one set of second-type parameters.

Different LCGs of the Y LCGs correspond to different second-type parameters.

Buffer state reports of a same one LCG of the Y LCGs is sent in a same one medium access control-control element (MAC-CE).

Buffer state reports of different LCGs are sent in different MAC-CEs.

Buffer state reports of a same one LCG is sent in a same one type of uplink data channel.

Buffer state reports of different LCGs are sent in different types of uplink data channels.

One LCG corresponds to one SR configuration group of the X SR configuration groups.

The second-type parameters include at least one of a type of uplink data channel, a downlink control channel resource group, a MAC-CE including a buffer state report, one buffer size, a TCI state group or a spatial relation information group.

The Y LCGs correspond to at least one TRP. That is, the buffer state information is sent to different TRPs through different LCGs.

In this embodiment of the present application, the method further includes at least one of the steps below.

Channel state information (CSI) or hybrid automatic repeat request acknowledgement (HARQ-ACK) information included in one uplink channel including scheduling request information corresponding to the scheduling request resources is determined according to an uplink control channel resource group including an uplink control channel resource corresponding to the scheduling request resources. For example, SR/HARQ-ACK/CSI information corresponding to the same control channel resource group can be included in one uplink channel, and SR/HARQ-ACK/CSI information corresponding to different control channel resource groups cannot be included in one uplink channel and needs to be included in different uplink channels. That is, CSI or HARQ-ACK information included in one uplink channel including scheduling request information corresponding to the scheduling request resources is CSI or HARQ-ACK information corresponding to the uplink control channel resource group where the uplink control channel resource corresponding to the scheduling request resources is located.

At least one of the scheduling request information corresponding to the scheduling request resources or CSI and HARQ-ACK information corresponding to a predetermined uplink control channel resource group is sent in one uplink channel. A group index of the predetermined uplink control channel resource group satisfies a predetermined condition. The predetermined condition may be, for example, an uplink control channel resource group corresponding to the lowest index, an uplink control channel resource group corresponding to the highest index or an uplink control channel resource group corresponding to a predetermined index. An uplink control channel resource in only some uplink control channel resource groups can include SR information.

At least one of the following corresponding to the same third-type parameters is sent in one uplink channel: an HARQ-ACK, a CSI, an SR, or an HARQ-ACK of a semi-persistent scheduling physical downlink shared channel (SPS PDSCH).

At least one of the following corresponding to different third-type parameters is sent in different uplink channels: an HARQ-ACK, a CSI, an SR, or an HARQ-ACK of an SPS PDSCH.

The third-type parameters include at least one of an uplink control channel resource group, a type of uplink data channel, a downlink control channel resource group, a transmission configuration indicator (TCI) state group, a spatial relation information group, a process number set or an antenna group. The one uplink channel includes an uplink control channel corresponding to one uplink control channel resource or includes one uplink data channel.

In this embodiment of the present application, the uplink data channel satisfies at least one of the following features: Each type of uplink data channel corresponds to one control channel resource group; each type of uplink data channel corresponds to one spatial relation information group; each type of uplink data channel corresponds to one TCI state group; each type of uplink data channel corresponds to one data channel process number set; each type of uplink data channel corresponds to one buffer of one LCG; an intersection between time-domain resources occupied by different data channels of a same type of uplink data channel is empty; different data channels of a same type of uplink data channel are not able to be sent simultaneously; an intersection between time-domain resources occupied by different data channels of the different types of uplink data channels is non-empty; different data channels of different types of uplink data channels are able to be sent simultaneously; different types of uplink data channels correspond to different spatial relation information or different spatial relation information groups; different types of uplink data channels are scheduled by downlink control channels in different downlink control channel resource groups; an intersection between data channel process number sets corresponding to different types of uplink data channels is empty; or different types of uplink data channels belong to one BWP or one component carrier.

In this embodiment of the present application, the method further includes determining, according to at least one of the following information, an uplink control channel resource or an HARQ-ACK codebook where an HARQ-ACK of a semi-persistent scheduled downlink data channel is located: a downlink control channel resource group including a control channel for scheduling the semi-persistent scheduled downlink data channel; an uplink control channel resource group including an uplink control channel indicated by the control channel for scheduling the semi-persistent scheduled downlink data channel; an uplink control channel resource group including an uplink control channel corresponding to a semi-persistent scheduled downlink data channel configured by a higher layer; an HARQ-ACK codebook corresponding to a predetermined index; or an HARQ-ACK codebook corresponding to fourth-type parameters corresponding to the semi-persistent scheduling downlink control channel, where the fourth-type parameters include at least one of an uplink control channel resource group, a type of uplink data channel, a downlink control channel resource group, a TCI state group, a spatial relation information group, a process number set or an antenna group.

For example, the uplink control channel resource where the HARQ-ACK of the semi-persistent scheduled downlink data channel is located is determined according to at least one of the following information: a downlink control channel resource group including a control channel for scheduling the semi-persistent scheduled downlink data channel; an uplink control channel resource group including an uplink control channel indicated by the control channel for scheduling the semi-persistent scheduled downlink data channel; or an uplink control channel resource group including an uplink control channel corresponding to a semi-persistent scheduled downlink data channel configured by a higher layer.

An HARQ-ACK codebook where an HARQ-ACK of a semi-persistent scheduled downlink data channel is located is determined according to at least one of the following information: an HARQ-ACK codebook corresponding to a predetermined index; or an HARQ-ACK codebook corresponding to fourth-type parameters corresponding to the semi-persistent scheduling downlink control channel. The fourth-type parameters include at least one of an uplink control channel resource group, a type of uplink data channel, a downlink control channel resource group, a TCI state group, a spatial relation information group, a process number set or an antenna group.

In this embodiment of the present application, the uplink control channel resource group satisfies at least one of the features below.

A maximum of C uplink control channel resources in one uplink control channel resource group in one time unit include HARQ-ACK information. The value of C belongs to {1, 2, 3, 4}.

Different uplink control channel resources including HARQ-ACK information in the one time unit belong to different uplink control channel resource groups.

An intersection between time units in which different uplink control channel resources in the one uplink control channel resource group are located is empty.

An intersection between time units in which different uplink control channel resources in different uplink control channel resource groups are located is non-empty.

An intersection between time-domain resources occupied by uplink control channel resources in the one uplink control channel resource group is empty.

An intersection between time-domain resources occupied by uplink control channel resources in the different uplink control channel resource groups is non-empty.

The one uplink control channel resource group corresponds to at least one fifth-type parameter. The at least one fifth-type parameter includes at least one of a downlink control channel resource group, a process number set, a TCI state group or a spatial relation information group. Different uplink control channel resource groups are scheduled by different downlink control channel resource groups. Alternatively, uplink control information (UCI) in different uplink control channel resource groups corresponds to HARQ-ACK information corresponding to PDSCHs scheduled by different downlink control channel resource groups and/or aperiodic channel state information (AP CSI) scheduled by different downlink control channel resource groups.

More than one uplink control channel resource group is located in one BWP.

In this embodiment of the present application, the SR information or buffer state information is sent based on the first type of information so that communication with at least one TRP through at least one uplink is achieved.

Figure 2:
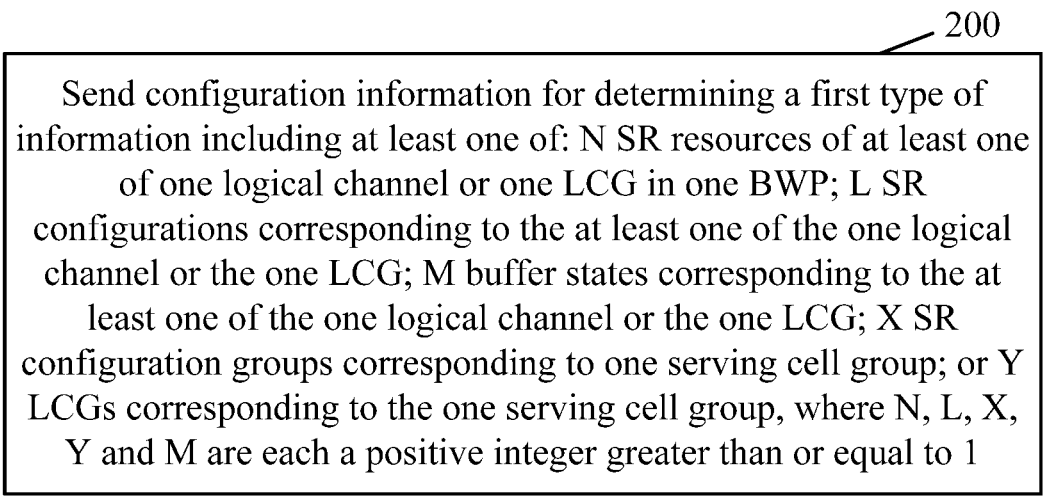
FIG. 2 is a flowchart of an information transmission method according to another embodiment of the present application.

Referring to FIG. 2, another embodiment of the present application provides an information transmission method. The method includes the steps below.

In step 200, configuration information for determining a first type of information is sent.

The first type of information includes at least one of N scheduling request resources of at least one of one logical channel or one LCG in one BWP; L SR configurations corresponding to the at least one of the one logical channel or the one LCG; M buffer states corresponding to the at least one of the one logical channel or the one LCG; X SR configuration groups corresponding to one serving cell group; or Y LCGs corresponding to the one serving cell group. N, L, X, Y and M are each a positive integer greater than or equal to 1.

In this embodiment of the present application, SR configurations are in one-to-one correspondence with SR identifiers (SRIDs).

In this embodiment of the present application, the N scheduling request resources satisfy at least one of the features below.

The N scheduling request resources correspond to one SR configuration, or the N scheduling request resources correspond to the L SR configurations.

The N scheduling request resources include N reference signal port groups of one uplink control channel resource.

The N scheduling request resources include N time-domain resource groups of one uplink control channel resource.

The N scheduling request resources include N frequency-domain resource groups of one uplink control channel resource.

The N scheduling request resources include N time-frequency resource groups of one uplink control channel resource.

The N scheduling request resources correspond to N pieces of spatial relation information.

The N scheduling request resources include N uplink control channel resources.

The N scheduling request resources correspond to N pieces of spatial relation information.

An intersection between time-domain resources and/or an intersection between frequency-domain resources occupied by the N scheduling request resources is empty.

The N scheduling request resources fall within one time unit. When the N scheduling request resources are periodic resources, that the N scheduling request resources fall within one time unit means that the N scheduling request resources fall within one time unit in one period.

The N scheduling request resources correspond to N pieces of period information.

The N scheduling request resources include the same or different scheduling request information.

The scheduling request information includes a positive SR and a negative SR.

The N scheduling request resources correspond to one or more buffers. The buffer is used for buffering new to-be-sent data.

The N scheduling request resources are triggered simultaneously or separately. Here "triggered" means "sent". "Sent simultaneously" means "sent in the same period", but does not mean that the N scheduling request resources occupy the same time-domain resources. "Sent separately" means that the N scheduling request resources are determined to be triggered/sent or not according to their respective buffer states.

In the above embodiment, N is greater than 1.

In this embodiment of the present application, the method satisfies at least one of the following features: Different control channel resources of the N uplink control channel resources belong to different uplink control channel resource groups; reference signal ports in one reference signal port group of the N reference signal port groups correspond to one piece of the spatial relation information; or N is equal to L.

In this embodiment of the present application, the scheduling request resource includes at least one of an uplink control channel resource, a reference signal port of one uplink control channel resource, a time-domain resource group of the one uplink control channel resource, a frequency-domain resource group of the one uplink control channel resource or a time-frequency resource group of the one uplink control channel resource.

In this embodiment of the present application, the method satisfies at least one of the following features: N is greater than or equal to L; N is greater than or equal to M; L is greater than or equal to M; X is equal to Y; at least one of N, L, M, X or Y is associated with the number of uplink control channel resource groups; the at least one of N, L, M, X or Y is associated with the number of downlink control channel resource groups; the at least one of N, L, M, X or Y is associated with the number of TCI state groups; the at least one of N, L, M, X or Y is associated with the number of spatial relation information groups; or the sum of at least two of N, L, M, X and Y is greater than 2.

In this embodiment of the present application, the uplink control channel includes a PUCCH, and the uplink data channel includes a PUSCH.

In this embodiment of the present application, the uplink control channel resource group satisfies at least one of the features below.

A maximum of C uplink control channel resources in one uplink control channel resource group in one time unit include HARQ-ACK information. The value of C belongs to {1, 2, 3, 4}.

Different uplink control channel resources including HARQ-ACK information in the one time unit belong to different uplink control channel resource groups.

An intersection between time units in which different uplink control channel resources in the one uplink control channel resource group are located is empty.

An intersection between time units in which different uplink control channel resources in different uplink control channel resource groups are located is non-empty.

An intersection between time-domain resources occupied by uplink control channel resources in the one uplink control channel resource group is empty.

An intersection between time-domain resources occupied by uplink control channel resources in the different uplink control channel resource groups is non-empty.

The one uplink control channel resource group corresponds to at least one fifth-type parameter. The at least one fifth-type parameter includes at least one of a downlink control channel resource group, a process number set, a TCI state group or a spatial relation information group. Different uplink control channel resource groups are scheduled by different downlink control channel resource groups. Alternatively, uplink control information (UCI) in different uplink control channel resource groups corresponds to HARQ-ACK information corresponding to PDSCHs scheduled by different downlink control channel resource groups and/or aperiodic channel state information (AP CSI) scheduled by different downlink control channel resource groups.

More than one uplink control channel resource group is located in one BWP.

In this embodiment of the present application, the SR information or buffer state information is sent based on the first type of information so that communication with at least one TRP through at least one uplink is achieved.

Embodiment One

Figure 3:
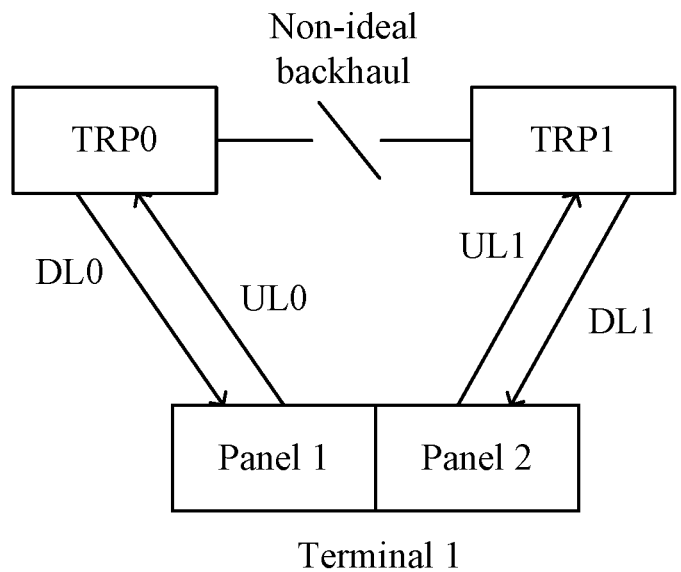
FIG. 3 is a diagram illustrating simultaneous communication between terminal 1 and two TRPs according to an embodiment of the present application.

In this embodiment, when two transmission reception points (TRPs) serve one terminal 1, especially when there is no ideal backhaul between the two TRPs, as shown in FIG. 3, both TRP0 and TRP1 can schedule uplink and downlink resources of the terminal 1. TRP0 sends downlink control information (DCI) 0 on downlink (DL) 0. DCI0 is used for scheduling terminal 1 to send physical uplink shared channel (PUSCH) 0 on uplink (UL) 0 through panel 1. TRP1 sends DCI1 on DL1. DCI1 is used for scheduling terminal 1 to send PUSCH1 on UL1 through panel 2. PUSCH0 and PUSCH1 belong to the same component carrier (CC), or even the same bandwidth part (BWP); or even a time-domain resource intersection between PUSCH0 and PUSCH1 is non-empty, but a frequency-domain resource intersection between PUSCH0 and PUSCH1 is empty, that is frequency division; or a time-domain resource intersection between PUSCH0 and PUSCH1 is non-empty, and a frequency-domain resource intersection between PUSCH0 and PUSCH1 is also non-empty, that is, space division.

To reduce the complexity of the terminal, the two TRPs share one medium access control (MAC) entity of the UE. That is, multiple TRPs correspond to one serving cell group (SCG). Under this assumption, it is a main problem to be solved in this embodiment as how to enable the terminal to communicate with the two TRPs on the two ULs separately. One or more of the following enhancement schemes may be used to reduce communication between TRPs and improving the resource utilization or link robustness.

Figure 4:
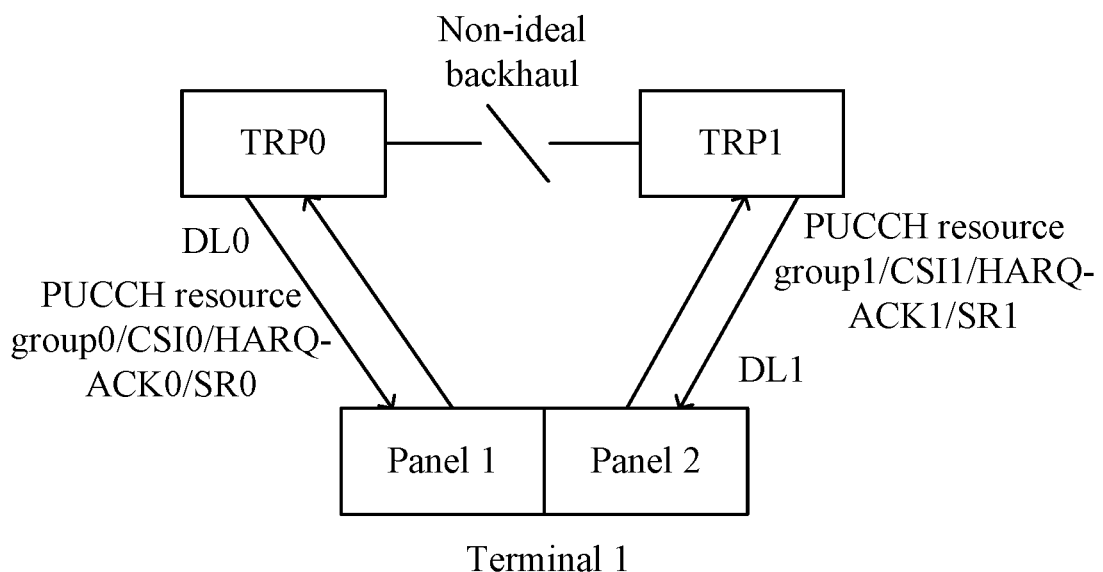
FIG. 4 is a diagram illustrating that a terminal feeds back, in different PUCCHs/PUSCHs, CSI/HARQ-ACKs/SRs corresponding to different TRPs to the different TRPs according to an embodiment of the present application.

In the description below, as shown in FIG. 4, hybrid automatic repeat request acknowledgement (HARQ-ACK) information of physical downlink shared channels (PDSCHs) scheduled by physical downlink control channels (PDCCHs) in different downlink control channel resources is fed back in different PUCCH resources to their respective TRPs, and channel state information (CSI) scheduled by PDCCHs in different downlink control channel resources is fed back in different PUCCH resources to their respective TRPs. Periodic CSI/SR information corresponding to different TRPs is also fed back in different PUCCH resources to their respective TRPs. In short, HARQ-ACK/CSI/SR information corresponding to different TRPs cannot be combined and sent in one PUCCH resource unless there is an ideal backhaul between the two TRPs. For example, HARQ-ACKi/CSIi/SRi information sent to TRPi can be combined and sent in one PUCCH resource; and when i is not equal to j, {CSIi, HARQ-ACKi, SRi} and {CSIj, HARQ-ACKj, SRj} cannot be combined and sent in one PUCCH resource. i, j=0, 1. A maximum of C PUCCH resources in one PUCCH resource group include HARQ-ACK information in one time unit. C is equal to 1 or 2. When C is equal to 1, different PUCCH resources corresponding to HARQ-ACK information in one time unit belong to different PUCCH resource groups. PUCCH resources in one PUCCH resource group can be in only the time-division multiplexing mode. PUCCH resources in different PUCCH resource groups can be in the frequency-division multiplexing mode or in the space-division multiplexing mode. PUCCH resources in different PUCCH resource groups are scheduled by downlink control channel resources in different downlink control channel resource groups. If two downlink control channel resources correspond to the same PUCCH resource group, that is, if there is an ideal backhaul between TRPs, and i is not equal to j, {CSIi, HARQ-ACKi, SRi} and {CSIj, HARQ-ACKj, SRj} can be combined and sent in one PUCCH resource.

Figure 5:
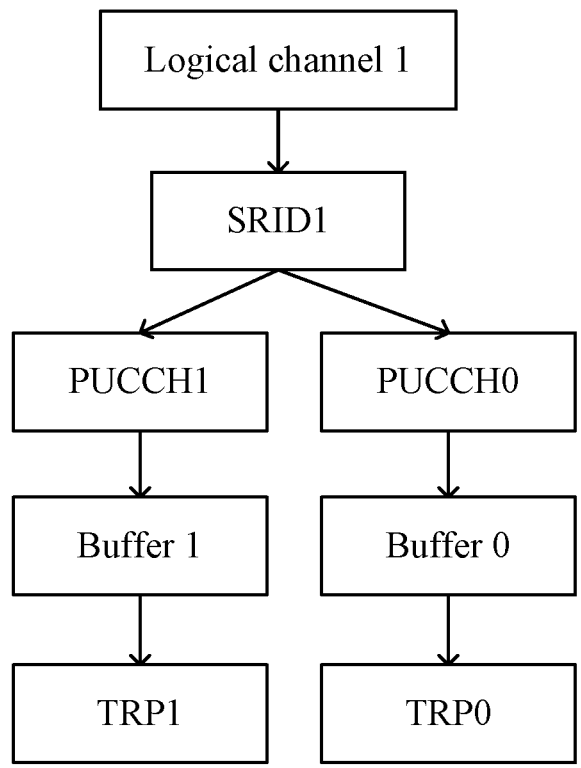
FIG. 5 is a diagram illustrating that an SRID corresponding to one logical channel corresponds to two PUCCH resources (or two scheduling request resources) and two buffers in one BWP according to an embodiment of the present application.

Enhancement scheme 1: One scheduling request (SR) configuration corresponds to N PUCCH resources (that is, N scheduling request resources) in one BWP. As shown in FIG. 5, one SR configuration corresponds to one SR identifier (SRID). For one SRID, two PUCCH resources {PUCCH0, PUCCH1} are configured in one BWP. Different PUCCH resources correspond to different TRPs. PUCCH0 is from PUCCH resource group 0. PUCCH0 corresponds to TRP0. PUCCH1 is from PUCCH resource group 1. PUCCH1 corresponds to TRP1. That is, one SRID corresponding to one logical channel or one logical channel group corresponds to N PUCCH resources in one BWP. N is a positive integer greater than or equal to 1. For example, N may be set to 1 when only one TRP is available, and N may be set to greater than 1 when two TRPs are available.

In one embodiment, reference signal port groups of the N PUCCH resources corresponding to the one SR configuration (the reference signal port groups include reference signal ports in PUCCH format0 and/or demodulation reference signal port groups in other PUCCH formats) are not code-divided. Further, a time-domain resource intersection and/or a frequency-domain resource intersection between the N PUCCH resources is empty.

Alternatively, one SR configuration corresponds to one PUCCH resource in one BWP. The one PUCCH resource corresponds to N reference signal port groups (that is, the N scheduling request resources). Each reference signal port group corresponds to one spatial transmission filter, that is, corresponds to one piece of spatial relation information. Reference signal ports in the same reference signal port group correspond to the same spatial relation information. For example, different reference signal ports in the same reference signal port group use the same radio frequency beam and different digital beams, and reference signal ports in different reference signal port groups use different spatial transmission filters. In one embodiment, different reference signal port groups are not code-divided, that is, frequency-divided or time-divided.

Alternatively, one SR configuration corresponds to one PUCCH resource in one BWP. The one PUCCH resource corresponds to one reference channel port group. The one reference signal port group corresponds to N pieces of spatial relation information. That is, one DMRS port corresponds to N spatial filters (that is, the N scheduling request resources).

Alternatively, one SR configuration corresponds to one PUCCH resource in one BWP. The one PUCCH resource corresponds to N frequency-domain resource groups and/or time-domain resource groups (that is, the N scheduling request resources). The one frequency-domain resource group and/or time-domain resource group corresponds to one piece of spatial relation information.

In the preceding description, one SRID corresponds to N scheduling request resources. The scheduling request resources include at least one of a PUCCH resource, a reference signal port group of one PUCCH resource, a time-domain resource group of the one PUCCH resource, a frequency-domain resource group of the one PUCCH resource, or a time-frequency resource group of the one PUCCH resource. The N scheduling request resources may correspond to different buffers. For example, as shown in FIG. 5, two scheduling request resources (for example, PUCCH resources shown in FIG. 5) each correspond to one buffer, and data in one logical channel or data in one logical channel group is divided into two parts. The two parts of data are stored in buffer 1 and buffer 0 respectively. The difference set and/or intersection between data in buffer 1 and data in buffer 0 is non-empty. Different buffers are sent to different TRPs. The two buffers may have the same data state. For example, the two buffers both store positive SR information or both store negative SR information. The two buffers may have different data states. For example, only one buffer stores positive SR information, that is, only one buffer has new to-be-sent data. Data in one LCG is allocated to two buffers according to signaling information sent by a base station, and/or data in one LCG is allocated, as implementation behavior of the terminal, to two buffers.

Figure 6:
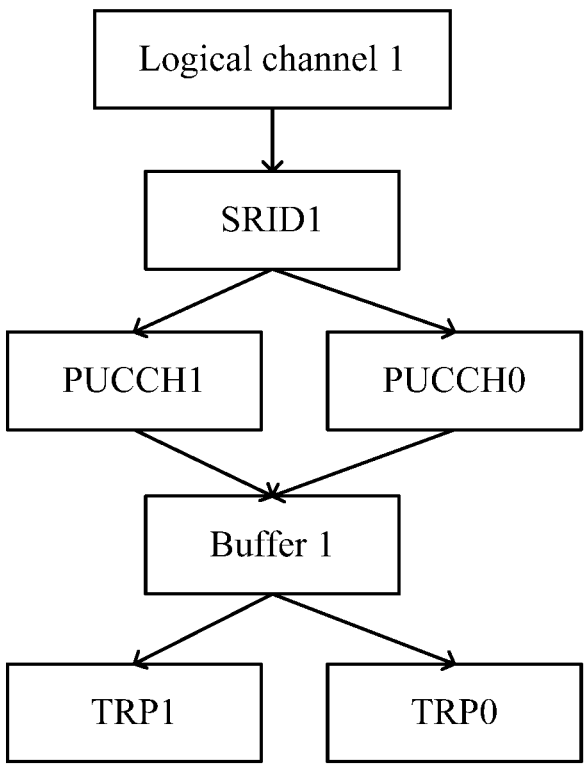
FIG. 6 is a diagram illustrating that an SRID corresponding to one logical channel corresponds to two PUCCH resources (or two scheduling request resources) and one buffer in one BWP according to an embodiment of the present application.

Alternatively, as shown in FIG. 6, two scheduling request resources (for example, PUCCH resources in FIG. 6) correspond to the same buffer. The N scheduling request resources are both positive SR information or are both store negative SR information. In short, the SR information corresponding to this buffer is sent to multiple TRPs, thereby improving the success rate and robustness of SR sending. Alternatively, the terminal selects one or more of the N scheduling request resources and sends the SR information corresponding to this buffer on the selected scheduling request resources. For example, the terminal selects PUCCH resources having a low transmitted power and sends the SR information on the selected PUCCH resources. After the SR information is sent, the two TRPs may communicate to determine the TRP to which the terminal sends the PUSCH resources, that is, determine whether data is sent using PUSCH0, using PUSCH1 or using both PUSCH0 and PUSCH1.

Figure 7:
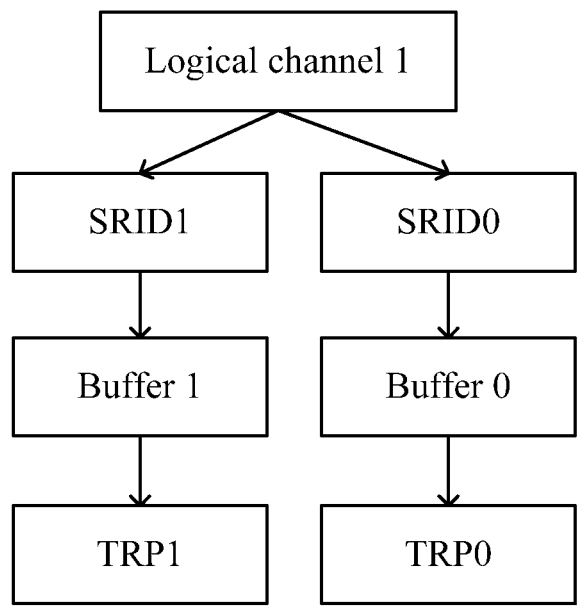
FIG. 7 is a diagram illustrating that one logical channel corresponds to two SRIDs and two buffers according to an embodiment of the present application.
Figure 8:
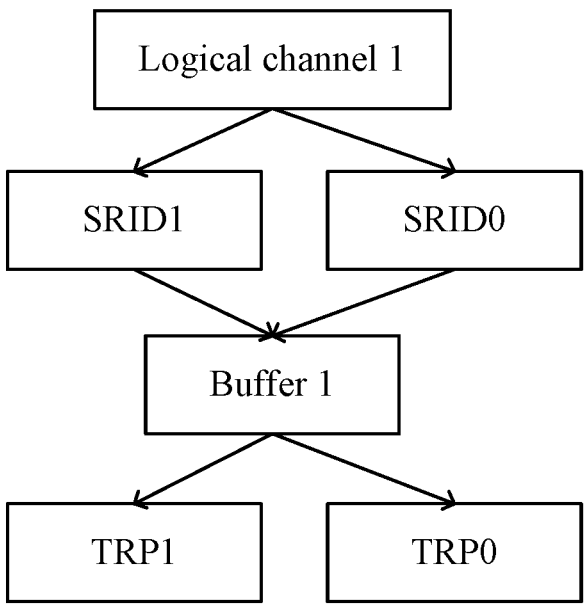
FIG. 8 is a diagram illustrating that one logical channel corresponds to two SRIDs and one buffer according to an embodiment of the present application.

Enhancement scheme 2: As shown in FIGS. 7 to 8, one logical channel corresponds to L SRIDs. L is a positive integer greater than or equal to 1. One SRID corresponds to one PUCCH resource in one BWP, enabling one logical channel to be associated with more than one PUCCH resource in one BWP.

As in enhancement scheme 1, the L SRIDs may correspond to the same or different SR information. As shown in FIG. 7, L SRIDs correspond to L buffers. In FIG. 7, L is 2 by way of example. The two buffers may correspond to the same or different SR information. For example, the two buffers both have to-be-sent data or both have no to-be-sent data. The L SRIDs may be triggered simultaneously or separately. For example, only part of the buffers has to-be-sent data. Alternatively, as shown in FIG. 8, L SRIDs correspond to a same buffer. In this case, L scheduling request resources corresponding to the L SRIDs correspond to the same SR information. The SR resources corresponding to the L SRIDs may be triggered simultaneously. The terminal sends one piece of SR information to different TRPs through multiple links, increasing the transmission robustness of the SRs. Alternatively, positive SR information is sent on scheduling request resources corresponding to some of the L SRIDs.

Figure 9:
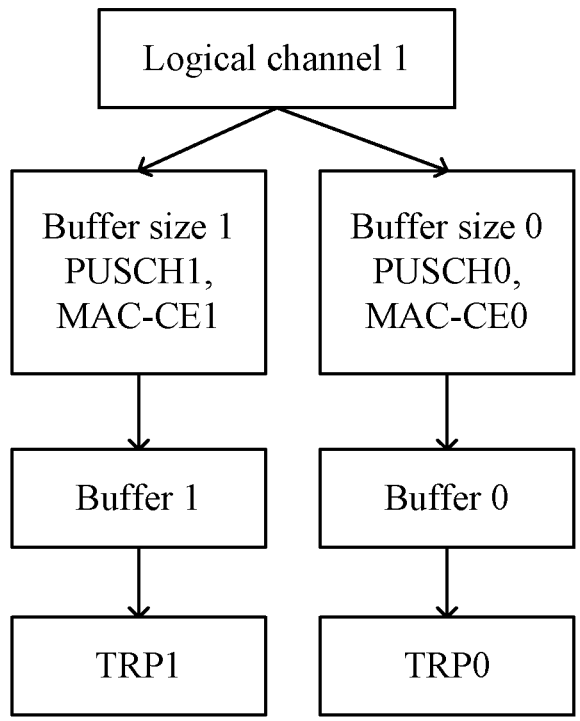
FIG. 9 is a diagram illustrating that one LCG corresponds to two buffer state reports and two buffers according to an embodiment of the present application.

Enhancement scheme 3: One LCG corresponds to M buffer states. As shown in FIG. 9, different buffer states correspond to different TRPs and different buffers, and different buffer state reports are included in different MAC-CE commands and sent in different PUSCHs. For example, when the terminal has to-be-sent data in one LCG, data in the one LCG is divided into two parts and sent to different TRPs. That is, in the buffer state reports included in different PUSCHs, one LCG may correspond to different buffer sizes. For example, the buffer size of LCG1 in the buffer state report in PUSCH0 is 1200 bits, and the buffer size of LCG1 in the buffer state report in PUSCH1 is 800 bits. Alternatively, the buffer size of LCG1 in PUSCH0 and the buffer size of LCG1 in PUSCH1 are both 1000, but after the buffer state reports are sent, the different 1000-bit information of LCG1 sent to different TRPs are independent of each other and correspond to buffer 0 and buffer 1 respectively. Alternatively, the difference set between the different 1000-bit information of LCG1 sent to different TRPs is empty. That is, the same data is sent to different TRPs on two uplinks, increasing the link robustness. This is also applicable to separate scheduling by multiple TRPs. In one embodiment, PUSCH0 and the PUSCH1 correspond to two types of PUSCHs, correspond to two uplink data channel process number sets and are scheduled by control channel resources in different downlink control channel resource groups. The different downlink control channel resource groups correspond to different TRPs.

Figure 10:
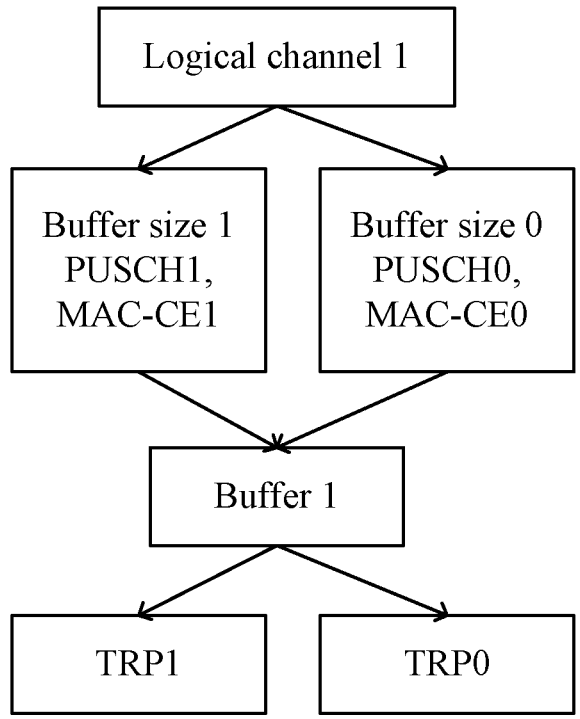
FIG. 10 is a diagram illustrating that one LCG corresponds to two buffer state reports and one buffer according to an embodiment of the present application.

Alternatively, as shown in FIG. 10, one LCG corresponds to M buffer states, different buffer states correspond to different TRPs and the same buffer, and different buffer state reports are sent in PUSCHs in different MAC-CE commands.

Figure 11:
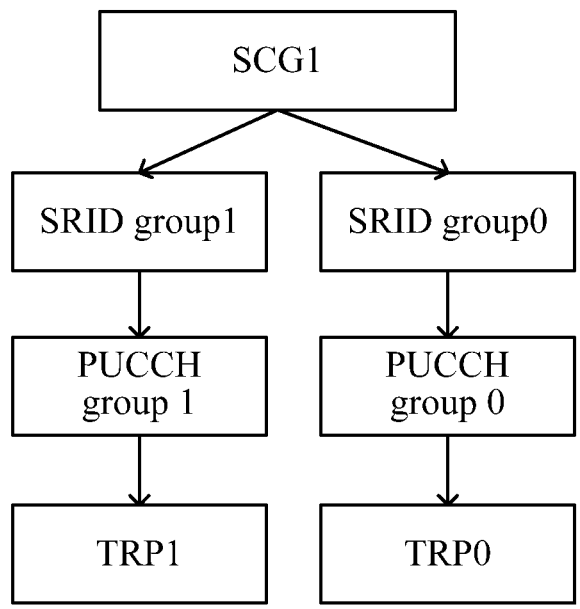
FIG. 11 is a diagram illustrating that one SCG corresponds to two SRID groups and two PUCCH resource groups according to an embodiment of the present application.

Enhancement scheme 4: As shown in FIG. 11, SRIDs under one serving cell group (SCG) are divided into two groups (that is, the X SRID groups). Each SRID group corresponds to one TRP, and different SRID groups correspond to different TRPs.

An intersection between corresponding SRIDs in different SRID groups may be non-empty or empty.

That each SRID group corresponds to one TRP, and different SRID groups correspond to different TRPs includes that each SRID group corresponds to one set of first-type parameters, and different SRID groups correspond to different first-type parameters. The first-type parameters include at least one of a PUCCH resource group, a type of PUCCH (for example, different types of PUSCHs are scheduled by downlink control channels in different downlink control channel resource groups), a downlink control channel resource group, SR information, a TCI state group or a spatial relation information group. One SRID corresponds to one or more logical channels. For example, a total of eight SRIDs are available. The eight SRIDs are divided into two groups. SRID group 1 includes {SRID0 to SRID3}. SRID group 2 includes {SRID4 to SRID7}. SR information corresponding to logical channels corresponding to SRIDs in SRID group 1 can be combined and fed back in one PUCCH resource/PUSCH. SR information corresponding to logical channels corresponding to SRIDs in different SRID groups cannot be combined and fed back in one PUCCH resource/PUSCH. Here the "combined" means that one piece of positive SR information is selected from one SRID group and then sent. For example, when feedback in a PUCCH is performed, in SR information corresponding to logical channels corresponding to SRIDs in the same SRID group, when three SRIDs are in the positive SR state, one of the three SRIDs in the positive SR state is fed back on one PUCCH resource in the PUCCH resource group corresponding to the SRID group; and when two SRIDs in the positive SR state belong to different SRID groups, the two SRIDs can be fed back on only two PUCCH resources, where the two PUCCH resources belong to different PUCCH resource groups.

Figure 12:
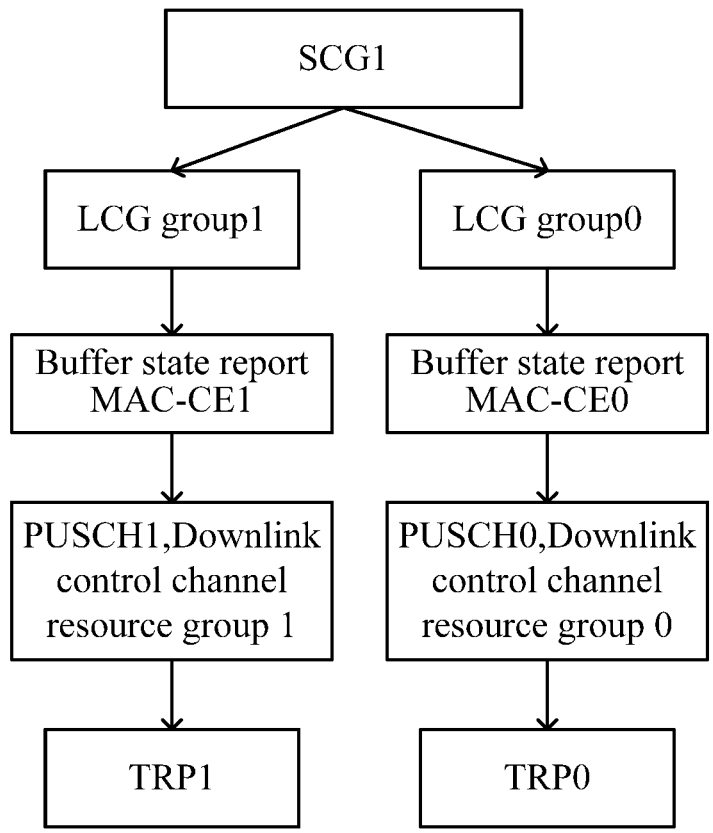
FIG. 12 is a diagram illustrating that one SCG corresponds to two LCGs, two buffer state reports and two downlink control channel resource groups according to an embodiment of the present application.

Enhancement scheme 5: LCGs under one SCG are divided into Y LCGs. As shown in FIG. 12, LCGs under one SCG are divided into two groups. Each LCG corresponds to one TRP. An intersection between corresponding LCGs in different LCGs may be non-empty or empty. That each LCG corresponds to one TRP, and different LCGs correspond to different TRPs includes that each LCG corresponds to one set of second-type parameters, and different LCGs correspond to different second-type parameters. Further, the Y LCGs correspond to Y SRID groups, and LCGs are in one-to-one correspondence with SRIDs.

The second-type parameters include at least one of a type of PUSCH (for example, different types of PUSCH channels are scheduled by downlink control channels in different downlink control channel resource groups), a downlink control channel resource group, a MAC-CE including a buffer state report, a buffer size, a TCI state group or a spatial relation information group.

One LCG includes one or more logical channels. For example, a total of eight LCGs are available. The eight LCGs are divided into two groups. LCG 1 includes {LCG0 to LCG3}. LCG 2 includes {LCG4 to LCG7}. PUSCH0 (a first type of PUSCH) includes transmission information of a buffer size corresponding to an LCG in LCG 1. PUSCH1 (a second type of PUSCH) includes transmission information of a buffer size corresponding to an LCG in LCG 2. Buffer state information in one LCG can be combined and fed back in one PUSCH belonging to a type of PUSCH corresponding to the one LCG. Buffer state information in different LCGs cannot be combined and fed back in one PUSCH and can only be fed back in different types of PUSCHs. Different types of PUSCHs correspond to different TRPs and are scheduled by different control channel resources.

Two TRPs are used as an example in the preceding description. In this embodiment, the case where the transmission is performed based on more than two TRPs is not excluded.

On the other hand, at least one of N, L, M, X or Y is associated with the number of uplink control channel resource groups, and/or at least one of N, L, M, X or Y is associated with the number of downlink control channel resource groups, and/or at least one of N, L, M, X or Y is associated with the number of transmission configuration indicator (TCI) states, and/or at least one of N, L, M, X or Y is associated with the number of spatial relation information groups, and/or the sum of at least two of N, L, M, X and Y is greater than 2. One TCI state includes indication information of one quasi co-location reference signal set. Different TCI state groups correspond to downlink signals sent by different TRPs. Different spatial relation information groups correspond to downlink signals sent by different TRPs.

In the preceding description, there is an association between different PUCCH resource groups and different downlink control channel resource groups. In another implementation of this embodiment, there may be a correspondence between different PUCCH resource groups and different TCI state groups. For example, TCI state group 0 corresponds to TRP0, and TCI state group 1 corresponds to TRP1. According to the TCI state group to which the TCI state of a PDSCH belongs, the PUCCH resource group to which the PUCCH resource where the HARQ-ACK corresponding to the PDSCH is located belongs is determined. For example, when the TCI state of a PDSCH belongs to TCI state group 0, the PUCCH resource where the HARQ-ACK corresponding to the PDSCH is located belongs to PUCCH resource group 0. For example, when the TCI state of a PDSCH belongs to TCI state group 1, the PUCCH resource where the HARQ-ACK corresponding to the PDSCH is located belongs to PUCCH resource group 1.

Similarly, there may be an association between different PUCCH resource groups and different spatial relation information groups.

Similarly, there is an association between different types of PUSCHs and different TCI state groups, and/or there is a correspondence between different types of PUSCHs and different spatial relation information groups.

The more than one LCG may all be a dedicated traffic channel.

Embodiment Two

In this embodiment, the PUCCH resource where at least one of an SR, or an HARQ-ACK of an SPS PDSCH is located, is determined. For example, according to a predetermined rule, the SR and/or the HARQ-ACK of the SPS PDSCH is determined to be in a PUCCH resource in the PUCCH resource group corresponding to the lowest index (or the highest index); and/or according to a predetermined rule, the SR and/or the HARQ-ACK of the SPS PDSCH is determined to be in an HARQ-ACK codebook in the HARQ-ACK codebook group corresponding to the lowest index (or the highest index); and/or according to the PUCCH resource group where the PUCCH resource for SR configuration is located, the PUCCH resource where the SR is located is determined.

The PUCCH resource and/or HARQ-ACK codebook where the HARQ-ACK of the SPS PDSCH is located is determined according to at least one of the following pieces of information below.

Scheme 1: a downlink control channel resource group including a control channel for scheduling the semi-persistent scheduled downlink data channel. For example, one HARQ-ACK codebook corresponding to a downlink control channel resource group including the DCI for scheduling the SPS PDSCH and/or one uplink control channel resource in an uplink control channel resource group corresponding to a downlink control channel resource group including the DCI for scheduling the SPS PDSCH is the PUCCH resource and/or HARQ-ACK codebook where the HARQ-ACK of the SPS PDSCH is located.

Scheme 2: an uplink control channel resource group including an uplink control channel indicated by the control channel for scheduling the semi-persistent scheduled downlink data channel, that is, an uplink control channel resource indicated in DCI.

Scheme 3: an uplink control channel resource group including an uplink control channel corresponding to a semi-persistent scheduled downlink data channel configured by a higher layer.

Scheme 4: an HARQ-ACK codebook corresponding to a predetermined index.

Scheme 5: an HARQ-ACK codebook corresponding to fourth-type parameters corresponding to the SPS PDSCH. The fourth-type parameters include at least one of an uplink control channel resource group, a type of uplink data channel, a downlink control channel resource group, a TCI state group, a spatial relation information group, a process number set or an antenna group.

Scheme 1 and/or scheme 2 may be used when there is a PDCCH corresponding to the SPS PDSCH (that is, the first SPS PDSCH transmission after the DCI activating the SPS PDSCH); and one of scheme 3, scheme 4 or scheme 5 may be used when there is no PDCCH corresponding to the SPS PDSCH. Alternatively, scheme 3 is used when there is no PDCCH corresponding to the SPS PDSCH and when currently only the SPS PDSCH is available and no other PDSCH is available; otherwise, one of scheme 3, scheme 4 or scheme 5 is used when there is no PDCCH corresponding to the SPS PDSCH.

Further, according to the PUCCH resource group to which the PUCCH resource where the SR and/or the HARQ-ACK of the SPS PDSCH is located belongs, HARQ-ACK/CSI information multiplexed with the SR and/or the HARQ-ACK of the SPS PDSCH and fed back in the same PUCCH resource or same type of PUSCH resource is determined. At least two of HARQ-ACKs/CSI/SRs/HARQ-ACKs of SPS PDSCHs corresponding to the same PUCCH resource group can be combined and fed back in one PUCCH resource/one PUSCH. At least two of HARQ-ACKs/CSI/SRs/HARQ-ACKs of SPS PDSCHs corresponding to different uplink control channel resource groups need to be fed back in different PUCCH resources/different PUSCHs.

Figure 13:
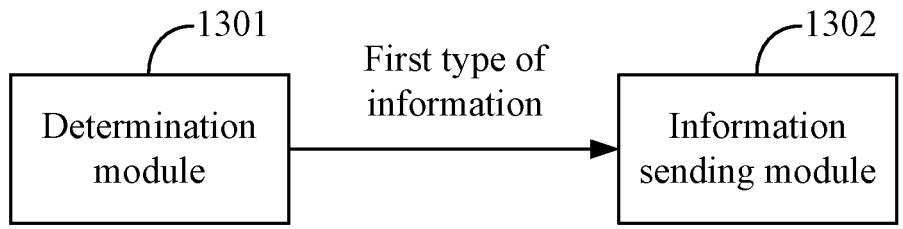
FIG. 13 is a diagram illustrating the structure of an information transmission apparatus according to another embodiment of the present application.

Referring to FIG. 13, another embodiment of the present application provides an information transmission apparatus. The apparatus includes a first determination module 1301 and an information sending module 1302. The first determination module 1301 is configured to determine a first type of information. The information sending module 1302 is configured to send at least one of scheduling request (SR) information or buffer state information according to the first type of information. The first type of information includes at least one of N scheduling request resources of at least one of one logical channel or one LCG in one BWP; L SR configurations corresponding to the at least one of the one logical channel or the one LCG; M buffer states corresponding to the at least one of the one logical channel or the one LCG; X SR configuration groups corresponding to one serving cell group; or Y LCGs corresponding to the one serving cell group. N, L, X, Y and M are each a positive integer greater than or equal to 1.

In this embodiment of the present application, SR configurations are in one-to-one correspondence with SR identifiers (SRIDs).

In this embodiment of the present application, the first determination module 1301 is configured to determine the first type of information in at least one of the manners below.

Configuration information is received, and the first type of information is determined according to the configuration information, where the configuration information may include the first type of information or include other information for indicating the first type of information.

The first type of information is determined according to a predetermined rule, for example, in a pre-agreed manner.

In this embodiment of the present application, the N scheduling request resources satisfy at least one of the features below.

The N scheduling request resources correspond to one SR configuration, or the N scheduling request resources correspond to the L SR configurations.

The N scheduling request resources include N reference signal port groups of one uplink control channel resource.

The N scheduling request resources include N time-domain resource groups of the one uplink control channel resource.

The N scheduling request resources include N frequency-domain resource groups of the one uplink control channel resource.

The N scheduling request resources include N time-frequency resource groups of the one uplink control channel resource.

The N scheduling request resources correspond to N pieces of spatial relation information of one reference signal port group of the one uplink control channel resource.

The N scheduling request resources include N uplink control channel resources.

The N scheduling request resources correspond to N pieces of spatial relation information.

An intersection between time-domain resources and/or an intersection between frequency-domain resources occupied by the N scheduling request resources is empty.

The N scheduling request resources fall within one time unit. When the N scheduling request resources are periodic resources, that the N scheduling request resources fall within one time unit means that the N scheduling request resources fall within one time unit in one period.

The N scheduling request resources correspond to N pieces of period information. The N scheduling request resources include the same or different scheduling request information. The scheduling request information includes a positive SR and a negative SR.

The N scheduling request resources correspond to one or more buffers. That is, data in one logical channel or one LCG is allocated to one or more buffers and then transmitted to different TRPs.

The buffer is used for buffering new to-be-sent data.

The N scheduling request resources are triggered simultaneously or separately. Here "triggered" means "sent". "Sent simultaneously" means "sent in the same period", but does not mean that the N scheduling request resources occupy the same time-domain resources. "Sent separately" means that the N scheduling request resources are determined to be triggered/sent or not according to their respective buffer states.

In the above embodiment, N is greater than 1.

In this embodiment of the present application, at least one of the following features is satisfied: Different control channel resources of the N uplink control channel resources belong to different uplink control channel resource groups; reference signal ports in one reference signal port group of the N reference signal port groups correspond to one piece of the spatial relation information; or N is equal to L.

In this embodiment of the present application, the scheduling request resource includes at least one of an uplink control channel resource, a reference signal port of one uplink control channel resource, a time-domain resource group of the one uplink control channel resource, a frequency-domain resource group of the one uplink control channel resource or a time-frequency resource group of the one uplink control channel resource.

In this embodiment of the present application, the method satisfies at least one of the following features: N is greater than or equal to L; N is greater than or equal to M; L is greater than or equal to M; X is equal to Y; at least one of N, L, M, X or Y is associated with the number of uplink control channel resource groups; the at least one of N, L, M, X or Y is associated with the number of downlink control channel resource groups; the at least one of N, L, M, X or Y is associated with the number of TCI state groups; the at least one of N, L, M, X or Y is associated with the number of spatial relation information groups; or the sum of at least two of N, L, M, X and Y is greater than 2.

In this embodiment of the present application, the uplink control channel includes a PUCCH, and the uplink data channel includes a PUSCH.

In this embodiment of the present application, the buffer state information includes buffer state report information.

In this embodiment of the present application, the information sending module 1302 is configured to send at least one of the SR information or the buffer state information according to the first type of information in at least one of the following manners: The SR information is sent according to the N scheduling request resources; the SR information is sent according to the L SR configurations; M pieces of buffer state information corresponding to the at least one of the one logical channel or the one LCG are sent according to the M buffer states, where M is a positive integer greater than or equal to 1; the SR information is sent according to the X SR configuration groups; or the at least one of the SR information or the buffer state information is sent according to the Y LCGs.

The information sending module 1302 is configured to send the SR information according to the N scheduling request resources in at least one of the manners below. At least one SR resource is selected from the N scheduling request resources, and the SR information is sent on the selected at least one SR resource. The selected at least one SR resource corresponds to at least one TRP.

That is, the SR information is sent to different TRPs on the selected different SR resources.

The SR information is sent on the N scheduling request resources. The N SR resources correspond to at least one TRP. That is, the SR information is sent to different TRPs on different SR resources.

Positive SR information is sent on at least one SR resource corresponding to the positive SR information among the N SR resources.

Moreover/alternatively, the information sending module 1302 is configured to send the SR information according to the L SR configurations in one of the manners below.

At least one SR resource is selected from SR resources corresponding to the L SR configurations, and the SR information is sent on the selected at least one SR resource. The selected at least one SR resource corresponds to at least one TRP. That is, the SR information is sent to different TRPs on the selected different SR resources.

The SR information is sent on the SR resources corresponding to the L SR configurations. The SR resources corresponding to the L SR configurations correspond to at least one TRP. That is, the SR information is sent to different TRPs on different SR resources.

Positive SR information is sent on an SR resource corresponding to at least one SR configuration corresponding to the positive SR information among the L SR configurations.

The information sending module 1302 is configured to send the M pieces of buffer state information corresponding to the at least one of the one logical channel or the one LCG according to the M buffer states in at least one of the manners below. The M pieces of buffer state information are sent in an M-type uplink data channel. The M pieces of buffer state information are sent in one time unit. The M pieces of buffer state information are sent in M medium access control-control element (MAC-CE) commands. The M pieces of buffer state information correspond to buffer states of M buffers of the one LCG. Buffer sizes included in the M pieces of buffer state information are independent. Here "independent" means that the buffer sizes are not associated with each other and may be the same or different. The sum of the buffer sizes included in the M pieces of buffer state information is equal to the buffer size of the one LCG. The buffer size of the one LCG is divided into M buffer sizes, and the M buffer sizes are sent in the M pieces of buffer state information. M is greater than 1.

The M pieces of buffer state information correspond to at least one TRP. That is, the M pieces of buffer state information are sent to different TRPs separately.

The information sending module 1302 is configured to send the SR information according to the X SR configuration groups in at least one of the manners below.

Each SR configuration group of the X SR configuration groups corresponds to one set of first-type parameters.

Different SR configuration groups of the X SR configuration groups correspond to different first-type parameters.

SR information in one SR configuration group of the X SR configuration groups is fed back in one uplink control channel resource or uplink data channel. The SR information in the SR configuration group is SR information corresponding to a logical channel corresponding to an SR configuration in the SR configuration group.

SR information in the different SR configuration groups is not able to be fed back in the one uplink control channel resource or uplink data channel.

The SR information in the different SR configuration groups is fed back in different uplink control channel resources or uplink data channels.

In the case where the SR information is sent in an uplink control channel using a first predetermined format, the each SR configuration group corresponds to one SR feedback bit. The first predetermined format includes any one of format 0 or format 1.

In the case where the SR information is sent in an uplink control channel using a second predetermined format or in an uplink data channel, the ith SR configuration group of the X SR configuration groups corresponds to $\lceil \log_2(K+1) \rceil$ feedback bits. i=0, 1, ..., X−1. $K_i$ denotes the number of SR configurations in the ith SR configuration group. The second predetermined format includes any one of format 2, format 3 or format 4.

X is greater than 1.

The first-type parameters include at least one of an uplink control channel resource group, a type of uplink data channel, a downlink control channel resource group, SR information, a transmission configuration indicator (TCI) state group or a spatial relation information group.

The X SR configuration groups correspond to at least one TRP. That is, the SR information is sent to different TRPs through different SR configuration groups.

The information sending module 1302 is configured to send the at least one of the SR information or the buffer state information according to the Y LCGs in at least one of the manners below.

Each LCG of the Y LCGs corresponds to one set of second-type parameters.

Different LCGs of the Y LCGs correspond to different second-type parameters.

Buffer state reports of a same one LCG of the Y LCGs is sent in a same one medium access control-control element (MAC-CE).

Buffer state reports of the different LCGs are sent in different MAC-CEs.

Buffer state reports of a same one LCG is sent in a same one type of uplink data channel.

Buffer state reports of the different LCGs are sent in different types of uplink data channels.

One LCG corresponds to one SR configuration group of the X SR configuration groups.

The second-type parameters include at least one of a type of uplink data channel, a downlink control channel resource group, a MAC-CE including a buffer state report, one buffer size, a TCI state group or a spatial relation information group.

The Y LCGs correspond to at least one TRP. That is, the buffer state information is sent to different TRPs through different LCGs.

In this embodiment of the present application, the first determination module 1301 is further configured to perform at least one of the steps below.

Channel state information (CSI) or hybrid automatic repeat request acknowledgement (HARQ-ACK) information included in one uplink channel including scheduling request information corresponding to the scheduling request resources is determined according to an uplink control channel resource group including an uplink control channel resource corresponding to the scheduling request resources. For example, SR/HARQ-ACK/CSI information corresponding to the same control channel resource group can be included in one uplink channel, and SR/HARQ-ACK/CSI information corresponding to different control channel resource groups cannot be included in one uplink channel and needs to be included in different uplink channels. That is, CSI or HARQ-ACK information included in one uplink channel including scheduling request information corresponding to the scheduling request resources is CSI or HARQ-ACK information corresponding to the uplink control channel resource group where the uplink control channel resource corresponding to the scheduling request resources is located.

At least one of the scheduling request information corresponding to the scheduling request resources or CSI and HARQ-ACK information corresponding to a predetermined uplink control channel resource group is sent in one uplink channel. A group index of the predetermined uplink control channel resource group satisfies a predetermined condition. The predetermined condition may be, for example, an uplink control channel resource group corresponding to the lowest index, an uplink control channel resource group corresponding to the highest index or an uplink control channel resource group corresponding to a predetermined index. An uplink control channel resource in only some uplink control channel resource groups can include SR information.

At least one of the following corresponding to the same third-type parameters is sent in one uplink channel: an HARQ-ACK, a CSI, an SR, or an HARQ-ACK of a semi-persistent scheduling physical downlink shared channel (SPS PDSCH).

The third-type parameters include at least one of an uplink control channel resource group, a type of uplink data channel, a downlink control channel resource group, a transmission configuration indicator (TCI) state group, a spatial relation information group, a process number set or an antenna group. The one uplink channel includes an uplink control channel corresponding to one uplink control channel resource or includes one uplink data channel.

In this embodiment of the present application, the uplink data channel satisfies at least one of the following features: Each type of uplink data channel corresponds to one control channel resource group; the each type of uplink data channel corresponds to one spatial relation information group; the each type of uplink data channel corresponds to one TCI state group; the each type of uplink data channel corresponds to one data channel process number set; the each type of uplink data channel corresponds to one buffer of one LCG; an intersection between time-domain resources occupied by different data channels of the same type of uplink data channel is empty; the different data channels of the same type of uplink data channel are not able to be sent simultaneously; an intersection between time-domain resources occupied by different data channels of the different types of uplink data channels is non-empty; the different data channels of the different types of uplink data channels are able to be sent simultaneously; the different types of uplink data channels correspond to different spatial relation information or different spatial relation information groups; the different types of uplink data channels are scheduled by downlink control channels in different downlink control channel resource groups; an intersection between data channel process number sets corresponding to the different types of uplink data channels is empty; or the different types of uplink data channels belong to one BWP or one component carrier.

In this embodiment of the present application, the first determination module 1301 is further configured to determine, according to at least one of the following information, an uplink control channel resource or an HARQ-ACK codebook where an HARQ-ACK of a semi-persistent scheduled downlink data channel is located: a downlink control channel resource group including a control channel for scheduling the semi-persistent scheduled downlink data channel; an uplink control channel resource group including an uplink control channel indicated by the control channel for scheduling the semi-persistent scheduled downlink data channel; an uplink control channel resource group including an uplink control channel corresponding to a semi-persistent scheduled downlink data channel configured by a higher layer; an HARQ-ACK codebook corresponding to a predetermined index; an HARQ-ACK codebook corresponding to a predetermined uplink control channel resource group index; or an HARQ-ACK codebook corresponding to fourth-type parameters corresponding to the semi-persistent scheduling downlink control channel, where the fourth-type parameters include at least one of an uplink control channel resource group, a type of uplink data channel, a downlink control channel resource group, a TCI state group, a spatial relation information group, a process number set or an antenna group.

In this embodiment of the present application, the uplink control channel resource group satisfies at least one of the features below.

A maximum of C uplink control channel resources in one uplink control channel resource group in one time unit include HARQ-ACK information. The value of C belongs to {1, 2, 3, 4}.

Different uplink control channel resources including HARQ-ACK information in the one time unit belong to different uplink control channel resource groups.

An intersection between time units in which different uplink control channel resources in the one uplink control channel resource group are located is empty.

An intersection between time units in which different uplink control channel resources in different uplink control channel resource groups are located is non-empty.

An intersection between time-domain resources occupied by uplink control channel resources in the one uplink control channel resource group is empty.

An intersection between time-domain resources occupied by uplink control channel resources in the different uplink control channel resource groups is non-empty.

The one uplink control channel resource group corresponds to at least one fifth-type parameter. The at least one fifth-type parameter includes at least one of a downlink control channel resource group, a process number set, a TCI state group or a spatial relation information group. Different uplink control channel resource groups are scheduled by different downlink control channel resource groups. Alternatively, uplink control information (UCI) in different uplink control channel resource groups corresponds to HARQ-ACK information corresponding to PDSCHs scheduled by different downlink control channel resource groups and/or aperiodic channel state information (AP CSI) scheduled by different downlink control channel resource groups.

More than one uplink control channel resource group is located in one BWP.

In this embodiment of the present application, the SR information or buffer state information is sent based on the first type of information so that communication with at least one TRP through at least one uplink is achieved.

Figure 14:
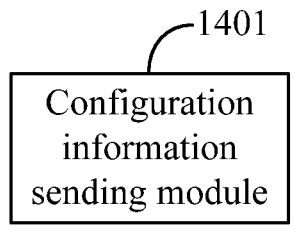
FIG. 14 is a diagram illustrating the structure of an information transmission apparatus according to another embodiment of the present application.

Referring to FIG. 14, another embodiment of the present application provides an information transmission apparatus. The apparatus includes a configuration information sending module 1401 configured to send configuration information for determining a first type of information. The first type of information includes at least one of N scheduling request resources of at least one of one logical channel or one LCG in one BWP; L SR configurations corresponding to the at least one of the one logical channel or the one LCG; M buffer states corresponding to the at least one of the one logical channel or the one LCG; X SR configuration groups corresponding to one serving cell group; or Y LCGs corresponding to the one serving cell group. N, L, X, Y and M are each a positive integer greater than or equal to 1.

In this embodiment of the present application, SR configurations are in one-to-one correspondence with SR identifiers (SRIDs).

In this embodiment of the present application, the N scheduling request resources satisfy at least one of the features below.

The N scheduling request resources correspond to one SR configuration, or the N scheduling request resources correspond to the L SR configurations.

The N scheduling request resources include N reference signal port groups of one uplink control channel resource.

The N scheduling request resources include N time-domain resource groups of the one uplink control channel resource.

The N scheduling request resources include N frequency-domain resource groups of the one uplink control channel resource.

The N scheduling request resources include N time-frequency resource groups of the one uplink control channel resource.

The N scheduling request resources correspond to N pieces of spatial relation information.

The N scheduling request resources include N uplink control channel resources.

The N scheduling request resources correspond to N pieces of spatial relation information.

An intersection between time-domain resources and/or an intersection between frequency-domain resources occupied by the N scheduling request resources is empty.

The N scheduling request resources fall within one time unit. When the N scheduling request resources are periodic resources, that the N scheduling request resources fall within one time unit means that the N scheduling request resources fall within one time unit in one period.

The N scheduling request resources correspond to N pieces of period information.

The N scheduling request resources include the same or different scheduling request information.

The scheduling request information includes a positive SR and a negative SR.

The N scheduling request resources correspond to one or more buffers. The buffer is used for buffering new to-be-sent data.

The N scheduling request resources are triggered simultaneously or separately. Here "triggered" means "sent". "Sent simultaneously" means "sent in the same period", but does not mean that the N scheduling request resources occupy the same time-domain resources. "Sent separately" means that the N scheduling request resources are determined to be triggered/sent or not according to their respective buffer states.

In the above embodiment, N is greater than 1.

In this embodiment of the present application, the apparatus satisfies at least one of the following features: Different control channel resources of the N uplink control channel resources belong to different uplink control channel resource groups; reference signal ports in one reference signal port group of the N reference signal port groups correspond to one piece of the spatial relation information; or N is equal to L.

In this embodiment of the present application, the scheduling request resource includes at least one of an uplink control channel resource, a reference signal port of one uplink control channel resource, a time-domain resource group of the one uplink control channel resource, a frequency-domain resource group of the one uplink control channel resource or a time-frequency resource group of the one uplink control channel resource.

In this embodiment of the present application, the method satisfies at least one of the following features: N is greater than or equal to L; N is greater than or equal to M; L is greater than or equal to M; X is equal to Y; at least one of N, L, M, X or Y is associated with the number of uplink control channel resource groups; the at least one of N, L, M, X or Y is associated with the number of downlink control channel resource groups; the at least one of N, L, M, X or Y is associated with the number of TCI state groups; the at least one of N, L, M, X or Y is associated with the number of spatial relation information groups; or the sum of at least two of N, L, M, X and Y is greater than 2.

In this embodiment of the present application, the uplink control channel includes a PUCCH, and the uplink data channel includes a PUSCH.

In this embodiment of the present application, the uplink control channel resource group satisfies at least one of the features below.

A maximum of C uplink control channel resources in one uplink control channel resource group in one time unit include HARQ-ACK information. The value of C belongs to $\{1, 2, 3, 4\}$.

Different uplink control channel resources including HARQ-ACK information in the one time unit belong to different uplink control channel resource groups.

An intersection between time units in which different uplink control channel resources in the one uplink control channel resource group are located is empty.

An intersection between time units in which different uplink control channel resources in different uplink control channel resource groups are located is non-empty.

An intersection between time-domain resources occupied by uplink control channel resources in the one uplink control channel resource group is empty.

An intersection between time-domain resources occupied by uplink control channel resources in the different uplink control channel resource groups is non-empty.

The one uplink control channel resource group corresponds to at least one fifth-type parameter. The at least one fifth-type parameter includes at least one of a downlink control channel resource group, a process number set, a TCI state group or a spatial relation information group. Different uplink control channel resource groups are scheduled by different downlink control channel resource groups. Alternatively, uplink control information (UCI) in different uplink control channel resource groups corresponds to HARQ-ACK information corresponding to PDSCHs scheduled by different downlink control channel resource groups and/or aperiodic channel state information (AP CSI) scheduled by different downlink control channel resource groups.

More than one uplink control channel resource group is located in one BWP.

In this embodiment of the present application, the SR information or buffer state information is sent based on the first type of information so that communication with at least one TRP through at least one uplink is achieved.

Another embodiment of the present application provides an information transmission apparatus.

The apparatus includes a processor and a computer-readable storage medium. The computer-readable storage medium stores instructions which, when executed by the processor, cause the processor to perform any preceding information transmission method.

Another embodiment of the present application provides a computer-readable storage medium.

The computer-readable storage medium stores a computer program which, when executed by a processor, causes the processor to perform the steps of any preceding information transmission method.

In a multi-TRP transmission scenario, establishment of communication with multiple TRPs results in a large signaling overhead and a reduced system performance.

Another embodiment of the present application provides an information determination method.

The method includes at least one of acquiring, according to one of a second type of information or a third type of information, the other one of the second type of information or the third type of information; or transmitting one piece of first signaling information including the second type of information and the third type of information. The second type of information includes at least one of a downlink control channel resource group, an uplink control channel resource group, a process number set, a transmission configuration indicator (TCI) state group, a spatial relation information group or an antenna group. The third type of information includes at least one of the following: the maximum number of data channels or code words (CWs) transmitted in one time-domain symbol of one bandwidth part (BWP) or component carrier (CC); the maximum number of data channels or CWs having intersecting time-domain resources in the one BWP or CC; a hybrid automatic repeat request acknowledgement (HARQ-ACK) feedback codebook; whether at least two of the HARQ-ACK, a scheduling request (SR) and channel state information (CSI) are fed back in one uplink channel; the maximum number of semi-persistent scheduling physical downlink shared channels (SPS PDSCHs) or CWs received in the one time-domain symbol of the one BWP or CC; the maximum number of grant-free physical uplink shared channels (PUSCHs) or CWs sent in the one time-domain symbol of the one BWP or CC; a table for mapping between a predetermined bit field value in downlink control information (DCI) and content indicated by the predetermined bit field value; spatial relation information; quasi co-location reference signal information; the number of times of beam switching; or activation or deactivation information of a semi-persistent signal.

In this embodiment of the present application, according to the one of the second type of information or the third type of information, the other one of the second type of information or the third type of information is acquired in the following manner: The third type of information is determined according to the number of pieces of the second type of information. For example, the number of the second type of information is used as the third type of information, or the number of the second type of information is calculated according to a predetermined function relationship so that the third type of information is obtained. When the second type of information includes multiple pieces of information, the number of pieces of the second type of information may be the maximum number of pieces of the second type of information, may be the minimum number of pieces of the second type of information and/or may be the number of pieces of the second type of information calculated according to another function relationship. A specific function relationship is not used for limitation of the protection scope of the embodiment of the present application.

In this embodiment of the present application, the HARQ-ACK feedback codebook is determined according to the second type of information in at least one of the following manners: The number of HARQ-ACK feedback codebooks whose feedback resources fall within one time unit that may be one or more slots is determined according to the second type of information; the number of HARQ-ACK feedback bits that are included in one HARQ-ACK feedback codebook and correspond to a type of downlink data channel whose classification standard is the end of the downlink data channel is determined according to the second type of information; or a loop of the second type of information is introduced in an acquisition process of the one HARQ-ACK feedback codebook.

In this embodiment of the present application, it is determined, according to the second type of information in at least one of the following manners, whether the at least two of the HARQ-ACK, the SR and the CSI are fed back in the one uplink channel: It is determined that at least two of HARQ-ACKs, SRs and CSI corresponding to the same second type of information are fed back in the one uplink channel; it is determined that at least two of HARQ-ACKs, SRs and CSI corresponding to different pieces of the second type of information are not able to be fed back in the one uplink channel; it is determined that the at least two of the HARQ-ACKs, the SRs and the CSI corresponding to the different pieces of the second type of information are fed back in different uplink channels; or it is determined, according to third signaling information, whether the at least two of the HARQ-ACKs, the SRs and the CSI corresponding to the different pieces of the second type of information are fed back in the one uplink channel. The uplink channel includes an uplink data channel, or an uplink control channel corresponding to one uplink control channel resource.

The method satisfies at least one of the features below.

Each piece of the second type of information corresponds to one piece of the third type of information.

The one piece of first signaling information includes a medium access control-control element (MAC-CE) command.

The one piece of first signaling information is used for notifying one of the second type of information or the third type of information and includes index information of the other type of information corresponding to the notified one type of information.

A predetermined bit field in the DCI includes at least one of a TCI field, a CSI request field, a sounding reference signal (SRS) request field, an uplink control channel resource indication field or an SRS resource indication field. The SRS request field is used for indicating sending of an aperiodic SRS. The SRS indication field is used for indicating a PUSCH transmission spatial filter and/or precoding information. in a case where received-beam switching between two signals that are in different time resources occurs, the two signals correspond to a same second type of information.

In this embodiment of the present application, in a multi-TRP transmission scenario, an association is established between the first type of information and the second type of information.

In this embodiment of the present application, one type of information is used in acquiring the other type of information, thereby reducing the signaling overhead and/or enabling different pieces of the second type of information elements to correspond to different third types of information elements, that is, enabling different TRPs to correspond to different third types of information, thus improving the parameter flexibility and the system performance.

Embodiment Three

Figure 15:
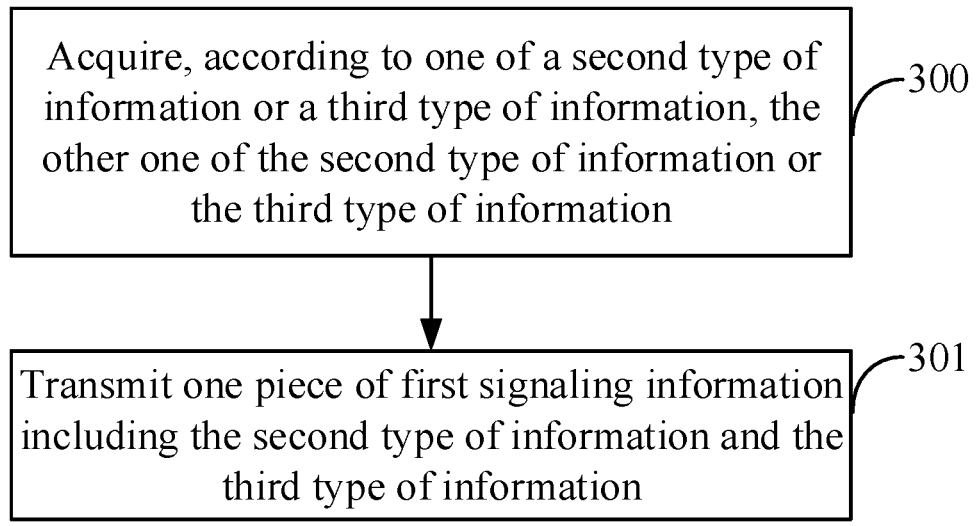
FIG. 15 is a flowchart of an information determination method according to another embodiment of the present application.

Referring to FIG. 15, in this embodiment, the information determination method includes at least one of steps 300 or 301. In step 300, according to one of a second type of information or a third type of information, the other one of the second type of information or the third type of information is acquired. In step 301, one piece of first signaling information including the second type of information and the third type of information is transmitted. The second type of information includes at least one of a downlink control channel resource group, an uplink control channel resource group, a process number set, a transmission configuration indicator (TCI) state group, a spatial relation information group or an antenna group. The third type of information includes at least one of the following: the maximum number of data channels or code words (CWs) received in one time-domain symbol of one bandwidth part (BWP) or component carrier (CC), and/or the maximum number of data channels or code words (CWs) sent in one time-domain symbol of one bandwidth part (BWP) or component carrier (CC); the maximum number of PDSCHs or CWs having intersecting time-domain resources in the one BWP or CC, and/or the maximum number of PUSCHs or CWs having intersecting time-domain resources in the one BWP or CC; a hybrid automatic repeat request acknowledgement (HARQ-ACK) feedback codebook; whether at least two of the HARQ-ACK, a scheduling request (SR) and channel state information (CSI) are fed back in one uplink channel; the maximum number of semi-persistent scheduling physical downlink shared channels (SPS PDSCHs) or CWs received in the one time-domain symbol of the one BWP or CC, and/or the maximum number of (grant-free PDSCHs) or CWs sent in the one time-domain symbol of the one BWP or CC; the maximum number of PUSCHs or CWs having intersecting time-domain resources in the one BWP or CC; a table for mapping between a predetermined bit field value in DCI and content indicated by the predetermined bit field value; spatial relation information; quasi co-location reference signal information; the number of times of beam switching; or activation or deactivation information of a semi-persistent signal.

Further, according to the one of the second type of information or the third type of information, the other one of the second type of information or the third type of information is acquired in the following manner: The third type of information is determined according to the number of pieces of the second type of information. For example, the number of the second type of information is used as the third type of information, or the number of the second type of information is calculated according to a predetermined function relationship so that the third type of information is obtained. When the second type of information includes multiple pieces of information, the number of pieces of the second type of information may be the maximum number of pieces of the second type of information, may be the minimum number of pieces of the second type of information and/or may be the number of pieces of the second type of information calculated according to another function relationship. A specific function relationship is not used for limitation of the protection scope of the embodiment of the present application.

Further, the HARQ-ACK feedback codebook is determined according to the second type of information in at least one of the following manners: The number of HARQ-ACK feedback codebooks whose feedback resources fall within one time unit is determined according to the second type of information; the number of HARQ-ACK feedback bits that are included in one HARQ-ACK feedback codebook and correspond to a type of PDSCH whose classification standard is the end of PDSCHs is determined according to the second type of information; or a loop of the second type of information is introduced in an acquisition process of the one HARQ-ACK feedback codebook.

Further, each piece of the second type of information corresponds to one piece of the third type of information. The signaling information includes a MAC-CE command. The signaling information is used for notifying one of the second type of information or the third type of information and includes index information of the other type of information corresponding to the notified one type of information. A predetermined bit field in the DCI includes at least one of a TCI field, a CSI request field, an SRS request field or a PUCCH resource indication field.

Further, it is determined, according to the second type of information in at least one of the following manners, whether the at least two of the HARQ-ACK, the SR and the CSI are able to be combined and fed back in the one PUCCH: It is determined that at least two of HARQ-ACKs, SRs and CSI corresponding to the same second type of information are able to be combined and fed back in the one PUCCH; it is determined that at least two of HARQ-ACKs, SRs and CSI corresponding to different pieces of the second type of information are not able to be fed back in the one PUCCH; it is determined that the at least two of the HARQ-ACKs, the SRs and the CSI corresponding to the different pieces of the second type of information are fed back in different PUCCHs; or it is determined, according to signaling information, whether the at least two of the HARQ-ACKs, the SRs and the CSI corresponding to the different pieces of the second type of information are able to combined and fed back in the one PUCCH.

Figure 17:
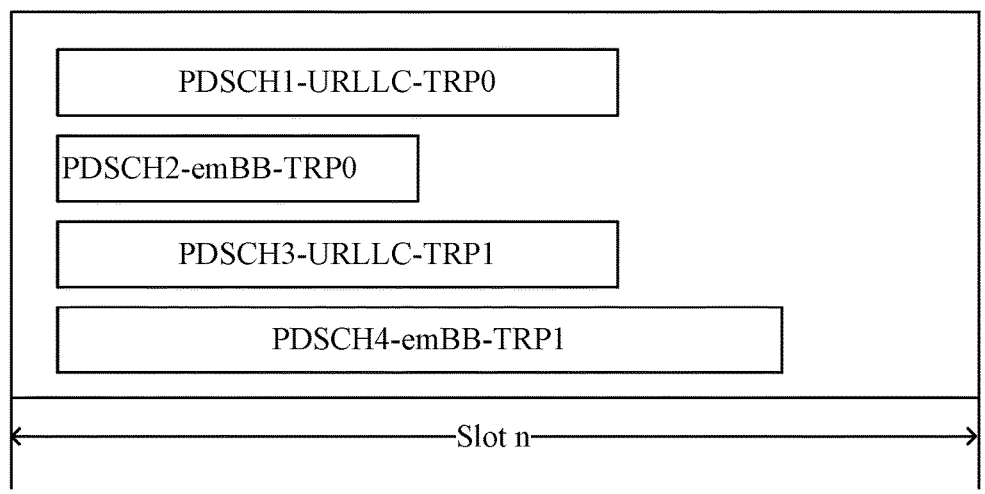
FIG. 17 is a diagram illustrating that the maximum number of PDSCHs/CWs having intersecting time-domain resources in one BWP or CC is determined according to a second type of information according to an embodiment of the present application.

For example, as shown in FIG. 17, TRPs correspond to different pieces of the second type of information; at least two of HARQ-ACKs, SRs and CSI corresponding to the same second type of information are able to be combined and fed back in the one PUCCH resource/PUSCH; at least two of HARQ-ACKs, SRs and CSI corresponding to different pieces of the second type of information are not able to be combined and fed back in the one PUCCH resource/PUSCH; it is determined, according to signaling information, whether the at least two of the HARQ-ACKs, the SRs and the CSI corresponding to the different pieces of the second type of information are able to be combined and fed back in the one PUCCH resource/PUSCH.

In a case where HARQ-ACK feedback codebook is determined, a loop of the second type of information may be introduced in an acquisition process of one HARQ-ACK feedback codebook.

For example, the loop of the second type of information may be placed to the end so that the HARQ-ACK feedback codebook is obtained. For example, feedback bits included in the HARQ-ACK feedback codebook are arranged in the following order: HARQ-ACK feedback bits corresponding to T time-division PDSCHs associated with the second type of information with index 0 and in the $(n-k_0)$th slot, HARQ-ACK feedback bits corresponding to T time-division PDSCHs associated with the second type of information with index 0 and in the $(n-k_1)$th slot, . . . , HARQ-ACK feedback bits corresponding to T time-division PDSCHs associated with the second type of information with index 0 and in the $(n-k_D)$th slot, HARQ-ACK feedback bit corresponding to TPDSCHs associated with a second type of information with index 1 and in the $(n-k_0)$th slot, HARQ-ACK feedback bits corresponding to T time-division PDSCHs associated with the second type of information with index 1 and in the $(n-k_1)$th slot, . . . , HARQ-ACK feedback bits corresponding to T time-division PDSCHs associated with the second type of information associated with index 1 and in the $(n-k_D)$th slot. Alternatively, in one HARQ-ACK feedback codebook, the loop of the second type of information is before a time-domain PDSCH loop. For example, HARQ-ACK bits included in the HARQ-ACK feedback codebook and corresponding to PDSCHs in a first time-domain resource group in the $(n-k_0)$th slot are arranged in the following order: an HARQ-ACK feedback bit corresponding to a PDSCH associated with the second type of information with index 0 of the first time-domain resource group in the $(n-k_0)$th slot, an HARQ-ACK feedback bit corresponding to a PDSCH associated with the second type of information with index 1 of the first time-domain resource group in the $(n-k_0)$th slot, then a loop of time-domain resource groups in the $(n-k_0)$th slot, and then a loop of slots. $(n-k_0), \ldots,$ and $(n-k_D)$ indicate a slot index of a PDSCH corresponding to an HARQ-ACK that needs to be fed back in slot n. $k_0\ k_1, \ldots,$ and $k_D$ may be positive integers or may be fractions when, for example, a subcarrier spacing of a PDSCH is different from a subcarrier spacing of a PUCCH.

Alternatively, for each different piece of second type of information, one HARQ-ACK codebook is obtained. That is, the number of HARQ-ACK feedback codebooks is determined according to the number of pieces of the second type of information configured for the terminal. The case where one piece of second type of information is configured for the terminal indicates that there is only one TRP, or there is an ideal backhaul between TRPs. In this case, only one HARQ-ACK feedback codebook needs to be fed back in one time unit. When more than one piece of second type of information is configured for the terminal, multiple TRPs are needed, there may be no ideal backhaul between TRPs, or TRPs can schedule the user independently of each other. Therefore, one HARQ-ACK feedback codebook needs to be sent to each different TRP. The HARQ-ACK feedback codebook is HARQ-ACK information corresponding PDSCHs from the each different TRP (that is, associated with the second type of information).

Further, it is feasible to determine, according to signaling information, whether HARQ-ACK codebooks corresponding to the second type of information with different indexes can be combined and fed back in one PUCCH resource/PUSCH. During the combination, it is feasible to link to the HARQ-ACK codebooks according to the index of the second type of information. For example, the HARQ-ACK codebook corresponding to the second type of information with index 0 is followed by the HARQ-ACK codebook corresponding to the second type of information with index 1. The two combined HARQ-ACK codebooks are input to and encoded in a channel encoder. The encoded HARQ-ACK codebooks are fed back in one PUCCH resource.

Figure 16:
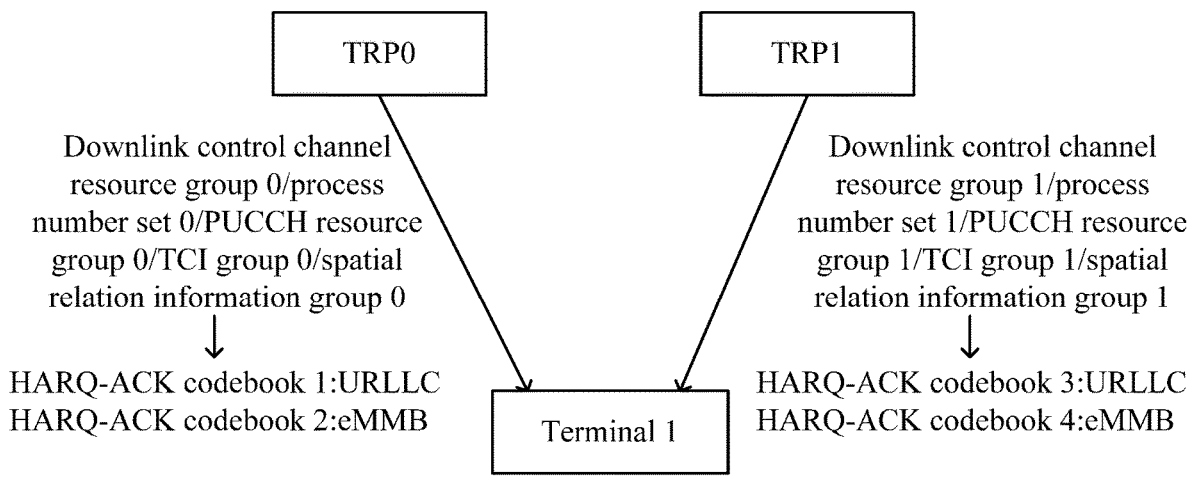
FIG. 16 is a diagram illustrating that each TRP has one HARQ-ACK feedback codebook for URLLC traffic and one HARQ-ACK feedback codebook for eMBB traffic according to an embodiment of the present application.

Further, as shown in FIG. 16, in one TRP, one HARQ-ACK codebook is obtained for Ultra-Reliable Low-Latency Communications (URLLC) traffic and enhanced Mobile Broadband (eMBB) traffic separately. One HARQ-ACK codebook is obtained for each different piece of second type of information and each different traffic type separately. As shown in FIG. 17, the second type of information with index 0 corresponds to TRP0, and the second type of information with index 1 corresponds to TRP1. In each TRP, two HARQ-ACK codebooks are obtained for different traffic types. If there are two pieces of second type of information and different traffic types, there may be four HARQ-ACK codebooks in one slot. HARQ-ACK codebook 1 and HARQ-ACK codebook 2 are fed back to TRP0. HARQ-ACK codebook 3 and HARQ-ACK codebook 4 are fed back to TRP0. In short, the number of HARQ-ACKs in one slot is determined based on the number of pieces of second type of information. The one slot is the slot where a resource (PUCCH/PUSCH) for feedback of an HARQ-ACK is located.

Alternatively, when there is an ideal backhaul between the two TRPs, the four HARQ-ACK feedback codebooks may be combined and then fed back in one PUCCH resource. In this case, the combination order of the four HARQ-ACK codebooks needs to be determined. For example, the combination order is HARQ-ACK codebook 1, HARQ-ACK codebook 3, HARQ-ACK codebook 2 and then HARQ-ACK codebook 4. That is, the HARQ-ACK feedback codebooks for the URLLC traffic are placed before other HARQ-ACK feedback codebooks. This is because during channel coding, the reliability of the bits in the front is higher than the channel reliability of the bits in the rear.

On the other hand, as shown in FIG. 17, it is needed to determine, according to the second type of information, the maximum number of PDSCHs/CWs whose intersection of time-domain resources occupied in one BWP/CC is non-empty. When one piece of second type of information is configured, the maximum number of PDSCHs/CWs whose intersection of time-domain resources occupied in one BWP/CC is non-empty belongs to $\{1, 2\}$. When two pieces of second type of information are configured, the maximum number of PDSCHs/CWs whose intersection of time-domain resources occupied in one BWP/CC is non-empty belongs to $\{1, 2, 3, 4\}$. Similarly, the number of uplink PUSCHs/CWs that can be sent simultaneously in the same time-domain symbol can also be acquired according to the second type of information. The number of uplink PUSCHs/CWs whose occupied time-domain resources have an intersection can also be acquired according to the second type of information.

In an implementation of this embodiment, the number of times of beam switching is determined according to the TCI state group and/or the antenna group in the following manner: When beams of two signals in different time-domain symbols are different, for example, when the signals do not satisfy a quasi co-location relationship with respect to spatial reception parameters, it is needed to determine, according to the TCI state group and/or the antenna group, whether beam switching occurs between the two signals. For example, when the two signals correspond to different TCI state groups and/or antenna groups, beam switching does not occur between the two signals, that is, the number of times of beam switching does not increase; otherwise, beam switching occurs between the two signals, that is, the number of times of beam switching increases by 1. Although received beams of the two signals are different, the two received beams corresponding to the two signals correspond to two receiving antennas, and the two receiving antennas are always in the on state on the terminal. In this manner, although the received beams of the two signals are different, this cannot be regarded as one-time beam switching since the receiving antennas are different. In short, the two signals experiencing beam switching need to correspond to the same receiving antenna group. The preceding scheme may be used in the scenario where the number of times of beam switching of the terminal in one defined time unit cannot exceed a predetermined threshold. Similarly, the number of times of beam switching may also be determined according to other second type of information.

In the preceding description, the third type of information is determined according to the second type of information. It is also feasible to determine the second type of information according to the third type of information.

In another implementation of this embodiment, one piece of signaling information is transmitted. The one piece of signaling information includes the second type of information and the third type of information. For example, the signaling information is a MAC-CE command. For example, the MAC-CE control signaling is MAC-CE control signaling for notifying the third type of information, and the MAC-CE control signaling includes index information of the second type of information.

Figure 18:
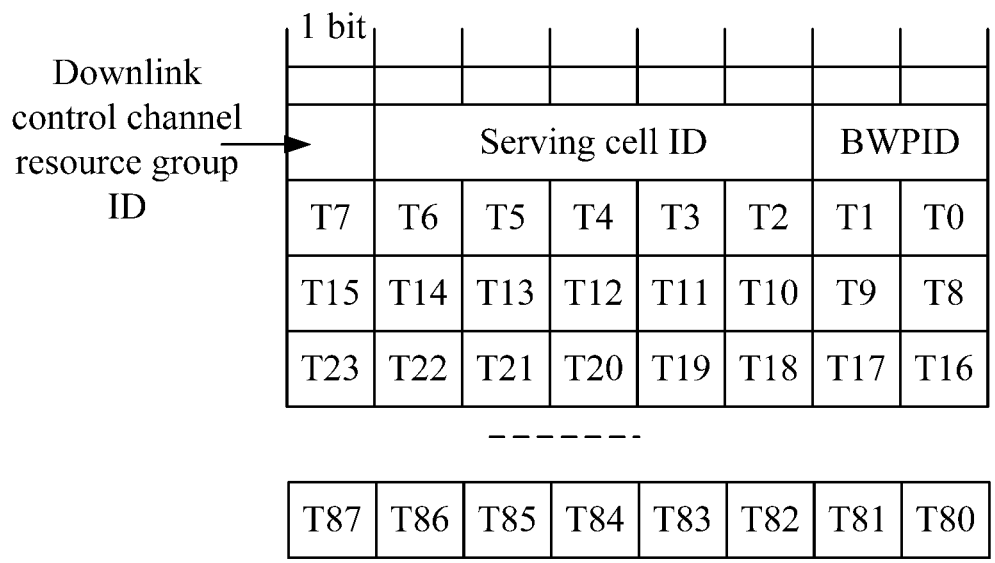
FIG. 18 is diagram one illustrating that a second type of information and a third type of information are transmitted in one piece of signaling information according to an embodiment of the present application.

For example, as shown in FIG. 18, the MAC-CE command for notifying a mapping between a TCI indication field value in the DCI and indicated TCI content includes an index of the second type of information, such as a control channel resource group index, indicating that what the MAC-CE command notifies is the mapping between a TCI indication field value in the DCI and the TCI content indicated by the TCI indication field value in the DCI corresponding to the index of the second type of information. Ti (i=0, 1, . . . , 87) in FIG. 18 corresponds to one TCI state in a TCI state list notified by RRC signaling. Ti=1 indicates that the TCI state is activated. Ti=0 indicates that the TCI state is deactivated. The eight values of the TCI indication field (three bits) in the DCI are in one-to-one correspondence with TCIs state having a Ti value of 1. As shown in FIG. 18, the index of the control channel resource group is 0, and Ti having a value of 1 includes {T1, T9, T18, T20, T30, T32, T34, T87}. In this case, a table of mapping between a TCI bit field values in DCI of the control channel resource group 0 and indicated TCI content is as shown by Table 1. In the case where the index of the control channel resource group is 1, and Ti having a value of 1 includes {T2, T11, T21, T24, T35, T37, T44, T80}, a table of mapping between a TCI bit field value in DCI of the control channel resource group 1 and indicated TCI content is as shown by Table 2.

TABLE 1

| TCI Bit Field Value | Indicated TCI Content |
|---|---|
| 000 | TCI state 1 |
| 001 | TCI state 9 |
| 010 | TCI state 18 |
| 011 | TCI state 20 |
| 100 | TCI state 30 |
| 101 | TCI state 32 |
| 110 | TCI state 34 |
| 111 | TCI state 87 |

TABLE 2

| TCI Bit Field Value | Indicated TCI Content |
|---|---|
| 000 | TCI state 2 |
| 001 | TCI state 11 |
| 010 | TCI state 21 |
| 011 | TCI state 24 |
| 100 | TCI state 35 |
| 101 | TCI state 37 |
| 110 | TCI state 44 |
| 111 | TCI state 80 |

The MAC-CE command in FIG. 18 carries a downlink control channel resource group index. Of course, the MAC-CE command in FIG. 18 may carry the preceding other second type of information, for example, a TCI state group index, indicating a TCI state group including a TCI state corresponding to Ti. Different TCI state groups may include different numbers of TCI states so that the number of needed Ti may be different. For example, TCI state group 0 corresponds to 88 Ti bits in FIG. 18. For example, TCI state group 1 corresponds to 48 Ti bits in FIG. 18.

Similarly, Ti in FIG. 18 may be in one-to-one correspondence with aperiodic-CSI trigger states so that in different DCI corresponding to different pieces of the second type of information, tables of mapping between CSI request fields and CSI indication contents are different.

Similarly, configuration information of an aperiodic-SRS request field may carry a downlink control channel resource group index for determining a mapping between a bit indication value of an aperiodic-SRS request field of DCI in a downlink control channel resource group and indicated aperiodic-SRS content. Different pieces of DCI in different downlink control channel resource groups may correspond to different mappings between bit indication values of aperiodic-SRS request fields and indicated aperiodic-SRS contents.

Similarly, configuration information of an SRS resource indication field of DCI may carry a downlink control channel resource group index for determining a mapping between a bit indication value of an SRS resource indication field of DCI in a downlink control channel resource group and an indicated SRS resource. Different pieces of DCI in different downlink control channel resource groups may correspond to different mappings between bit indication values of SRS resource indication fields and indicated SRS resources. The SRS resource indication field is used for indicating a spatial filter and/or precoding information and/or antenna port of a PUSCH. For example, the SRS resource indication field is used for indicating one or more SRS resources in an SRS set used for a codebook/non-codebook. The PUSCH spatial filter and/or precoding information and/or antenna port is acquired according to the indicated SRS resources.

Similarly, the MAC-CE command for activating or deactivating a half-periodic CSI-RS/CSI-IM may also carry an index of the second type of information, indicating which second type of information corresponds to the half-periodic CSI-RS/CSI-IM.

Figure 19:
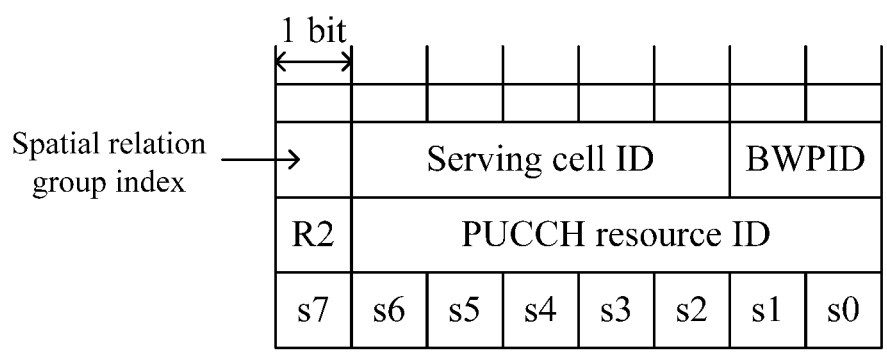
FIG. 19 is diagram two illustrating that a second type of information and a third type of information are transmitted in one piece of signaling information according to an embodiment of the present application.

Similarly, the MAC-CE command for activating a PUCCH-resource spatial relation carries a spatial relation group index as shown in FIG. 19, indicating a spatial relation group including a spatial relation corresponding to si (i=0, 1, . . . , 7). Different spatial relation groups may include different numbers of pieces of spatial relation information.

Embodiment Four

In this embodiment, a correspondence is established between downlink control channel resource groups and uplink data channel process number sets. For example, two downlink control channel resource groups are available, and different downlink control channel resource groups correspond to different TRPs. Different downlink control channel resource groups correspond to different PUSCH process number sets. For example, downlink control channel resource group 0 corresponds to PUSCH process number set {0 to 15}, and downlink control channel resource group 1 corresponds to PUSCH process number set {16 to 31}. When downlink control information (DCI) scheduling a PUSCH in downlink control channel resource group 0 indicates a process number of 0, downlink control channel resource group 0 corresponds to absolute process number 0. When DCI scheduling a PUSCH in downlink control channel resource group 1 indicates a process number of 0, downlink control channel resource group 1 corresponds to absolute process number 16.

Alternatively, different downlink control channel resources in two downlink control channel resource groups correspond to different PDSCH process number sets but correspond to the same PUSCH process number set. For example, downlink control channel resource group 0 corresponds to PUSCH process number set {0 to 15} and PDSCH process number set {0 to 15}, and downlink control channel resource group 1 corresponds to PUSCH process number set {0 to 15} and PDSCH process number set {16 to 31}. When DCI scheduling a PUSCH in downlink control channel resource group 0 indicates a process number of 0, downlink control channel resource group 0 corresponds to absolute process number 0. When DCI scheduling a PDSCH in downlink control channel resource group 0 indicates a process number of 0, downlink control channel resource group 0 corresponds to absolute process number 0. When DCI scheduling a PUSCH in downlink control channel resource group 1 indicates a process number of 0, downlink control channel resource group 1 corresponds to absolute process number 0. When DCI scheduling a PDSCH in downlink control channel resource group 1 indicates a process number of 0, downlink control channel resource group 1 corresponds to absolute process number 16.

In short, it is needed to establish an association between a downlink control channel resource group and at least one of a PUSCH process number set or a PDSCH process number set.

Alternatively, there is an association between a TCI group/spatial relation information group and at least one of a PUSCH process number set or a PDSCH process number set.

Another embodiment of the present application provides an information determination apparatus. The apparatus includes a second determination module configured to perform at least one of acquiring, according to one of a second type of information or a third type of information, the other one of the second type of information or the third type of information; or transmitting one piece of first signaling information including the second type of information and the third type of information. The second type of information includes at least one of: a downlink control channel resource group, an uplink control channel resource group, a process number set, a transmission configuration indicator (TCI) state group, a spatial relation information group or an antenna group. The third type of information includes at least one of: the maximum number of data channels or codewords (CWs) transmitted in one time-domain symbol of one bandwidth part (BWP) or component carrier (CC); the maximum number of data channels or CWs having intersecting time-domain resources in the one BWP or CC; a hybrid automatic repeat request acknowledgement (HARQ-ACK) feedback codebook; whether at least two of the HARQ-ACK, a scheduling request (SR) and channel state information (CSI) are fed back in one uplink channel; the maximum number of semi-persistent scheduling physical downlink shared channels (SPS PDSCHs) or CWs received in the one time-domain symbol of the one BWP or CC; the maximum number of grant-free physical uplink shared channels (PUSCHs) or CWs sent in the one time-domain symbol of the one BWP or CC; a table for mapping between a predetermined bit field value in downlink control information (DCI) and content indicated by the predetermined bit field value; spatial relation information; quasi co-location reference signal information; the number of times of beam switching; or activation or deactivation information of a semi-persistent signal.

In this embodiment of the present application, the second determination module 1801 is configured to determine the third type of information according to the number of the second type of information. For example, the number of the second type of information is used as the third type of information, or the number of the second type of information is calculated according to a predetermined function relationship so that the third type of information is obtained. When the second type of information includes multiple pieces of information, the number of pieces of the second type of information may be the maximum number of pieces of the second type of information, may be the minimum number of pieces of the second type of information and/or may be the number of pieces of the second type of information calculated according to another function relationship. A specific function relationship is not used for limitation of the protection scope of the embodiment of the present application.

In this embodiment of the present application, the second determination module 1801 is configured to determine the HARQ-ACK feedback codebook according to the second type of information in at least one of the manners below.

The number of HARQ-ACK feedback codebooks whose feedback resources fall within one time unit that may be one or more slots is determined according to the second type of information.

The number of HARQ-ACK feedback bits that are included in one HARQ-ACK feedback codebook and correspond to a type of downlink data channel whose classification standard is the end of the downlink data channel is determined according to the second type of information.

A loop of the second type of information is introduced in an acquisition process of the one HARQ-ACK feedback codebook.

In this embodiment of the present application, the second determination module 1801 is configured to determine, according to the second type of information in at least one of the following manners, whether the at least two of the HARQ-ACK, the SR and the CSI are fed back in the one uplink channel: It is determined that at least two of HARQ-ACKs, SRs and CSI corresponding to the same second type of information are fed back in the one uplink channel; it is determined that at least two of HARQ-ACKs, SRs and CSI corresponding to different pieces of the second type of information are not able to be fed back in the one uplink channel; it is determined that the at least two of the HARQ-ACKs, the SRs and the CSI corresponding to the different pieces of the second type of information are fed back in different uplink channels; or it is determined, according to third signaling information, whether the at least two of the HARQ-ACKs, the SRs and the CSI corresponding to the different pieces of the second type of information are fed back in the one uplink channel. The uplink channel includes an uplink data channel, or an uplink control channel corresponding to one uplink control channel resource.

The apparatus satisfies at least one of the features below.

Each piece of the second type of information corresponds to one piece of the third type of information.

The one piece of first signaling information includes a medium access control-control element (MAC-CE) command.

The one piece of first signaling information is used for notifying one of the second type of information or the third type of information and includes index information of the other type of information corresponding to the notified one type of information.

A predetermined bit field in the DCI includes at least one of a TCI field, a CSI request field, a sounding reference signal (SRS) request field, an uplink control channel resource indication field or an SRS resource indication field. The SRS request field is used for indicating sending of an aperiodic SRS. in response to received-beam switching between two signals that are in different time resources, the two signals correspond to a same second type of information.

In this embodiment of the present application, in a multi-TRP transmission scenario, an association is established between the second type of information and the third type of information. In this embodiment of the present application, one type of information among the second type of information and the third type of information is used in acquiring the other type of information so that different pieces of the second type of information correspond to different third types of information. Moreover, different pieces of the second type of information correspond to different TRPs, that is, different TRPs correspond to different third types of information. One piece of signaling information includes the second type of information and the third type of information. In this manner, the signaling overhead is reduced, and thus the parameter flexibility and the system performance are improved.

Another embodiment of the present application provides an information determination apparatus.

The apparatus includes a processor and a computer-readable storage medium. The computer-readable storage medium stores instructions which, when executed by the processor, cause the processor to perform any preceding information determination method.

Another embodiment of the present application provides a computer-readable storage medium. The computer-readable storage medium stores a computer program which, when executed by a processor, causes the processor to perform the steps of any preceding information determination method.

Figure 20:
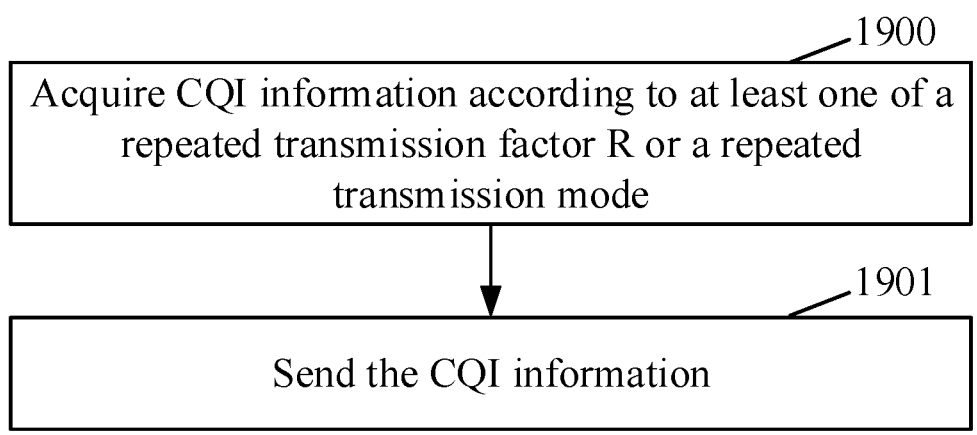
FIG. 20 is a flowchart of an information sending method according to another embodiment of the present application.

Referring to FIG. 20, another embodiment of the present application provides a feedback information sending method. The method includes the steps below.

In step 1900, channel quality indicator (CQI) information is acquired according to at least one of a repeated transmission factor R or a repeated transmission mode.

In this embodiment of the present application, the repeated transmission mode includes one of the modes below.

R layer groups correspond to R spatial-domain resources.

The R layer groups correspond to R frequency-domain resource groups, and an intersection between different frequency-domain resource groups is empty.

The R layer groups correspond to R time-domain resource groups, and an intersection between different time-domain resource groups is empty.

R repeated transmissions correspond to a redundancy version (RV) sequence.

Data channels corresponding to the R layer groups include repeated transmission of same information. R is a positive integer greater than 1.

The R layer groups or one piece of the CQI information corresponds to at least one of: A channel state information reference signal (CSI-RS) resources; A pieces of rank indicator (RI) information; A pieces of precoder matrix indicator (PMI) information; A quasi co-location reference signal sets, where the A quasi co-location reference signal sets may also be referred to as A TCI states, and one TCI state includes one quasi co-location reference signal set; or A column groups of one PMI, where one column of one PMI matrix corresponds to one layer.

A is equal to 1, or A is equal to R.

In this embodiment of the present application, the repeated transmission factor R satisfies at least one of the features below.

In the case where R is greater than 1, one piece of transmission information is repeatedly transmitted on R resources.

In the case where R is equal to 1, the one piece of transmission information is not repeatedly transmitted.

The R resources correspond to at least one of R time-domain resources, R spatial-domain resources, R frequency-domain resources, R reference signal (RS) resources, R quasi co-location reference signal (RS) sets, R RVs, R scrambling sequences or R layer groups.

In this embodiment of the present application, the CQI information is determined in the manner below.

An SINR-BLER mapping corresponding to each repeated transmission factor and/or repeated transmission mode corresponding to each piece of CQI information is established.

An SINR is acquired based on a measurement reference signal.

An SINR-BLER mapping corresponding to each modulation and coding scheme (MCS) corresponding to the current repeated transmission factor and/or repeated transmission mode is established.

The block error rate (BLER) corresponding to the SINR acquired based on the measurement reference signal is acquired according to the obtained SINR-BLER mapping.

The minimum value of CQI information whose BLER is less than a preset threshold is acquired.

In step 1901, the CQI information is sent.

In this embodiment of the present application, the CQI information is acquired according to at least one of the repeated transmission factor or the repeated transmission mode. This transmission scheme is closer to the actual PDSCH transmission scheme, thereby enabling the CQI to be fed back more accurately, improving the spectral efficiency and reducing interference. Moreover, the implementation complexity of a base station is reduced. This is because the base station does not need to calculate the CQI actually used in PDSCH transmission based on the CQI fed back by a terminal. In this calculation process, different implementation algorithms between the base station and the terminal lead to inaccurate calculation.

Embodiment Five

In this embodiment, two TRPs send the same PDSCH data to one terminal simultaneously. For example, one DMRS port corresponds to two TCI states; or the same transmission information is transmitted at two DMRS ports, and the two DMRSs may correspond to the same or different modulation orders and/or channel code rates. That is, data is repeatedly transmitted in a space division manner.

Figure 21:
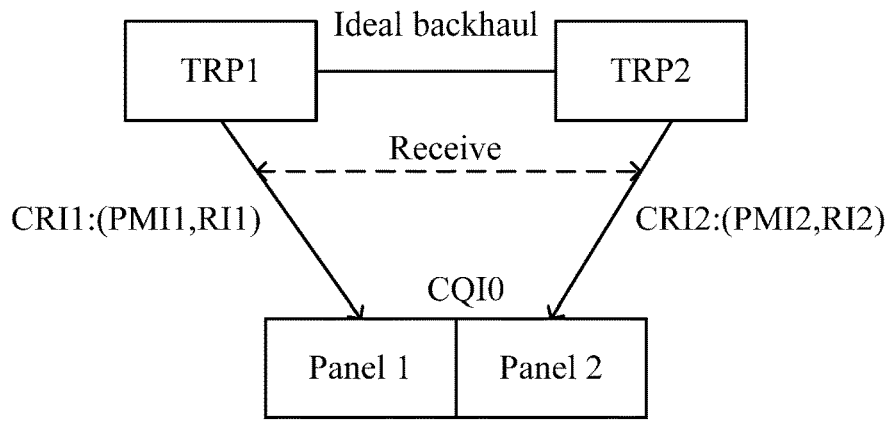
FIG. 21 is a diagram illustrating that CQI is fed back according to a repeated transmission factor R according to an embodiment of the present application.

In order for the terminal to feed back an accurate channel quality indicator (CQI), when the terminal feeds back the CQI, it is needed to assume whether an intersection between data from the two TRPs is empty or not. Based on this assumption, the terminal feeds back the CQI information. As shown in FIG. 21, a base station allocates two CSI-RS resources (CRI1 and CRI2) to the terminal. Each CSI-RS resource includes 32 CSI-RS ports. That is, one CSI-RS resource corresponds to one TRP. The terminal feeds back one (PMI1, RI1) for each CSI-RS resource. As shown in FIG. 21, (PMI1, RI1) is fed back based on CRI1, and (PMI2, RI2) is fed back based on CRI2; and then one CQI, for example, CQI0, is fed back based on the two combinations (PMI, RI). Further, the terminal needs to assume the transmission schemes of the PDSCHs corresponding to the two layers corresponding to the two combinations (PMI, RI). For example, for CRI1, (PMI1, RI1) is fed back, and for CRI2, (PMI2, RI2) is fed back. For example, RI1 and RI2 are both 1 (or RI1=2, and RI2=1; and, of course, other combinations are not excluded). The CQI fed back when different data are transmitted on layer RI1 and layer RI2 may be different from the CQI fed back when the same data is transmitted on layer RI1 and layer RI2.

Figure 22:
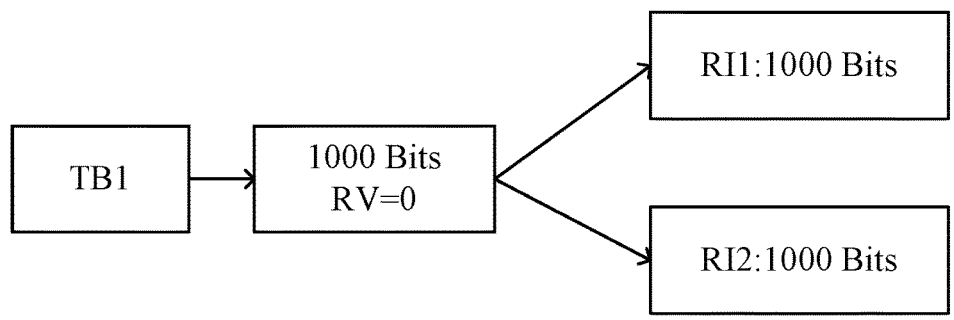
FIG. 22 is a diagram illustrating that coded bit sequences of the same RV of one TB are transmitted in layer RI1 and layer RI2 according to an embodiment of the present application.
Figure 23:
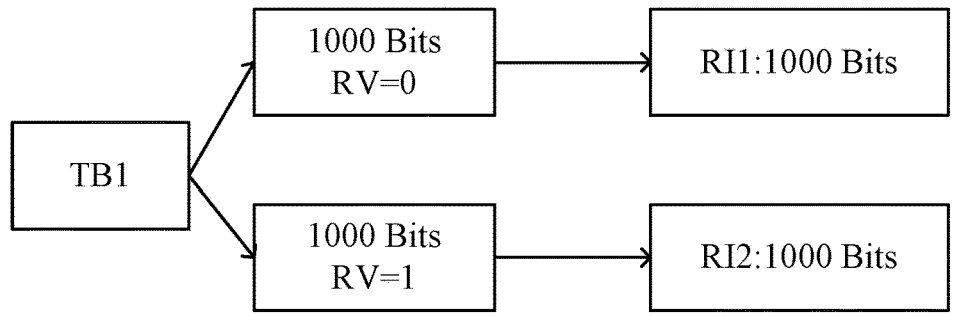
FIG. 23 is a diagram illustrating that coded bit sequences of different RVs of one TB are transmitted in layer RI1 and layer RI2 according to an embodiment of the present application.

For example, when transmission information (that is, information bits before channel coding) transmitted in layer RI1 and transmission information (that is, information bits before channel coding) transmitted in layer RI2 are the same (or when an intersection between transmission information included in layer RI1 and transmission information included in layer RI2 is non-empty), CQI1 is fed back, indicating that one TB uses the modulation order, target code rate and transport block size indicated by CQI1. Moreover, when layer RI1 and layer RI2 each includes a channel coded bit sequence corresponding to one RV of the one TB and the channel coded bit sequence is transmitted on a CSI reference resource, the probability of occurrence of an error in the one TB does not exceed 0.1 (or 0.00001), that is, layer RI1 and layer RI2 each includes one RV of the one TB, as shown in FIG. 23. Alternatively, layer RI1 and layer RI2 include repeated transmission of the same RV As shown in FIG. 22, for example, 1000 channel coded bits corresponding to one RV of one TB are transmitted in each of layer RI1 and layer RI2.

Figure 24:
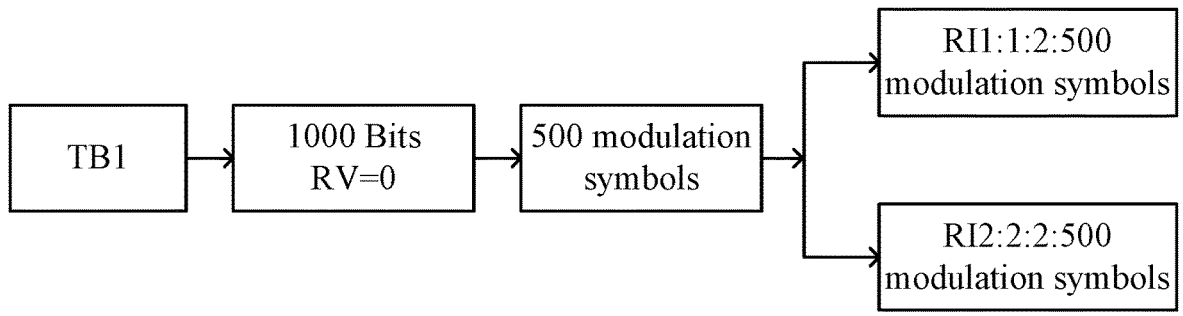
FIG. 24 is a diagram illustrating that modulated symbol for channel coded bits of one RV corresponding to one TB are subjected to layer mapping across layer RI1 and layer RI2 followed by frequency-domain resource mapping followed by time-domain resource mapping according to an embodiment of the present application.

When transmission information transmitted in layer RI1 and transmission information transmitted in layer RI2 are different, CQI2 is fed back, indicating that one TB uses the modulation order, target code rate and transport block size indicated by CQI2. Moreover, when layer RI1 and layer RI2 correspond to different channel coded bits of one RV of the one TB and the channel coded bits are transmitted on a CSI reference resource (that is, an intersection between transmission information included in layer RI1 and transmission information included in layer RI2 is empty), the probability of occurrence of an error in the one TB does not exceed 0.1 (or 0.00001), that is, one RV of the one TB experiences layer mapping across layer RI1 and layer RI2 followed by frequency-domain resource mapping followed by time-domain resource mapping. As shown in FIG. 24, for example, RV=0 of one TB includes 1000 channel coded bits, and the 1000 bits are modulated into 500 modulation symbols. 250 modulation symbols corresponding to odd index in the 500 modulation symbols are transmitted in layer RI1. 250 modulation symbols corresponding to even index in the 500 modulation symbols are transmitted in layer RI2.

Further, it is needed to assume whether the same data is transmitted in layer RI1 and layer RI2 in a space division manner (that is, a time-frequency resource intersection between layer RI1 and layer RI2 is non-empty and/or a time-frequency resource difference set between layer RI1 and layer RI2 is empty), in a frequency division manner (that is, a time-frequency resource difference set between layer RI1 and layer RI2 is empty, and a frequency-domain resource intersection between layer RI1 and layer RI2 is empty, that is, PMI1 and PMI2 correspond to different CSI-RS resources and frequency-domain resources, or that is, one CQI is formed by corresponding PMIs and RIs on different frequency-domain resources) or in a time division manner (that is, a time-frequency resource intersection between layer RI1 and layer RI2 is empty). The CQI is obtained based on the assumption and fed back to the base station, and if the assumption is different, the feedback CQI may be different. Further, in the case of repetitive transmissions in a space division manner, a CQI corresponding the case where layer RI1 and layer RI2 correspond to the same channel scrambling sequence is different from a CQI corresponding the case where layer RI1 and layer RI2 correspond to the different channel scrambling sequences.

In the preceding description, the CQI is obtained based on the assumption of the scheme of transmission between different layer groups corresponding to the two combinations (PMI, RI). It is also feasible to obtain a corresponding CQI based on the assumption of whether the scheme of transmission between different layer groups sent by the same RI of the same CSI-RS resource is repetition. Here one layer corresponds to one column of a precoder matrix indicator (PMI). The PMI is a matrix of the number of CSI-RS ports*RI, where the RI denotes the number of layers.

Similarly, when in the process of CQI acquisition for one CSI-RS resource, it is needed to assume aggregation, that is, a time-domain repeated transmission factor, that is, a different CQI may be fed back in response to a different number of repetitions in time-domain when a PDSCH is transmitted. For the same layer group, a different CQI may be fed back in response to a different time-domain repetition factor.

Similarly, a different CQI may be fed back in response to a different redundancy version used in repeated transmission.

Similarly, during repeated transmission, a CQI obtained based on the same modulation order across different repeated transmissions may be different from a CQI obtained based on different modulation orders across different repeated transmissions. It is needed to obtain a CQI based on whether modulation orders across different repeated transmissions are the same.

Similarly, during repeated transmission, a CQI obtained based on the same channel code rate across different repeated transmissions may be different from a CQI obtained based on different channel code rates across different repeated transmissions. It is needed to obtain a CQI based on whether channel code rates across different repeated transmissions are the same.

Figure 25:
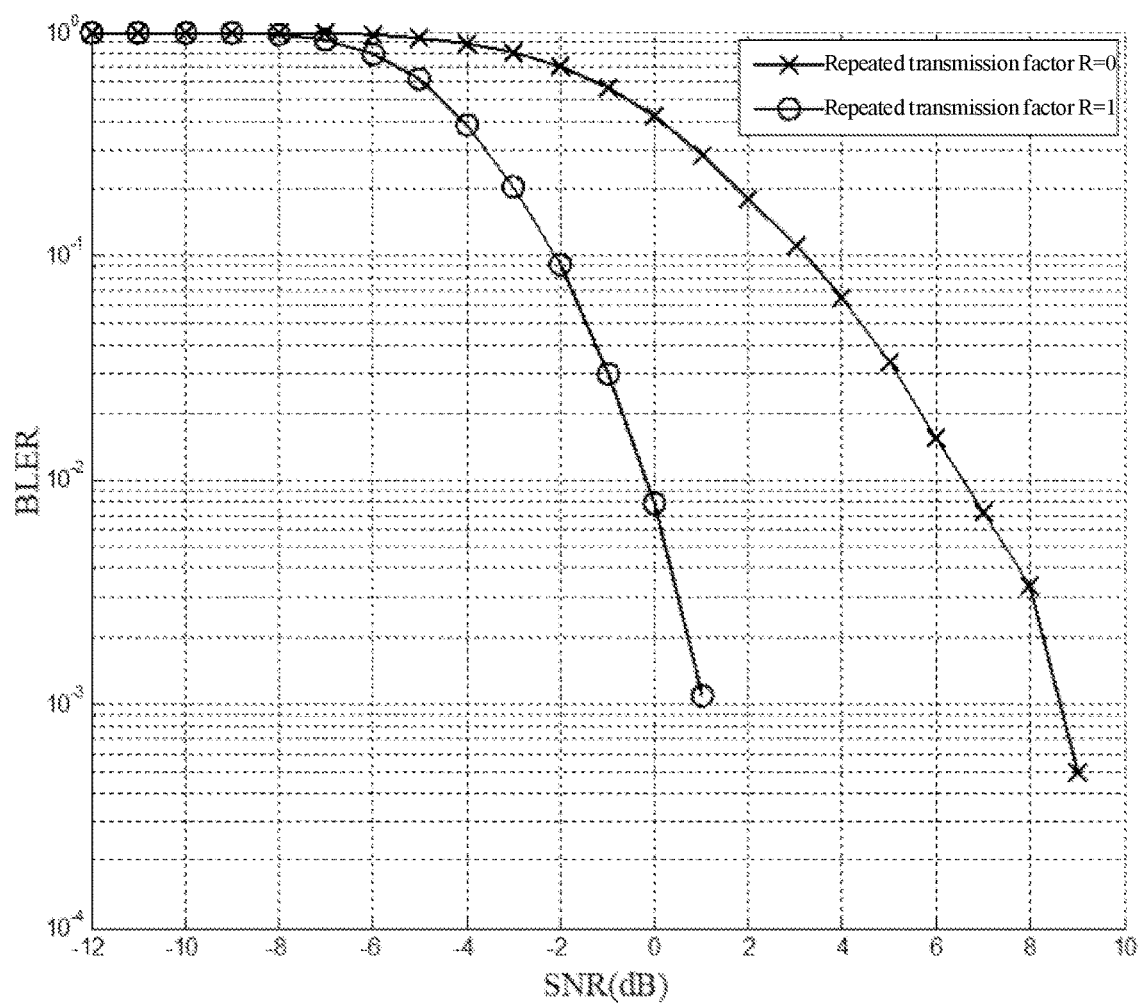
FIG. 25 is a graph illustrating two different SINR-BLER curves with different repeated transmission factors according to an embodiment of the present application.

For example, the terminal obtains the CQI according to the at least one of the repeated transmission factor or the repeated transmission mode in the following manner: The terminal stores an SINR-BLER mapping curve corresponding to each CQI index for each of the at least one of the repeated transmission factor or the repeated transmission mode based on the reception algorithm of the terminal. With a fixed CQI index, the SINR-BLER mapping curve varies with the at least one of the repeated transmission factor or the repeated transmission mode. As shown in FIG. 25, each horizontal coordinate indicates an SINR, each vertical coordinate indicates a BLER, and based on one CQI, the SINR-BLER mapping curve varies with the repeated transmission factor. When the terminal obtains one SINR based on a measurement reference signal, the terminal searches for the SINR-BLER mapping curve of each MCS corresponding to each of the currently assumed at least one of the repeated transmission factor or the repeated transmission mode, searches for a CQI index with a BLER less than 0.1 (or 0.00001) with an SINR currently obtained based on the measurement reference signal, and then uses the minimum one of these CQI indexes as the current CQI.

Figure 26:
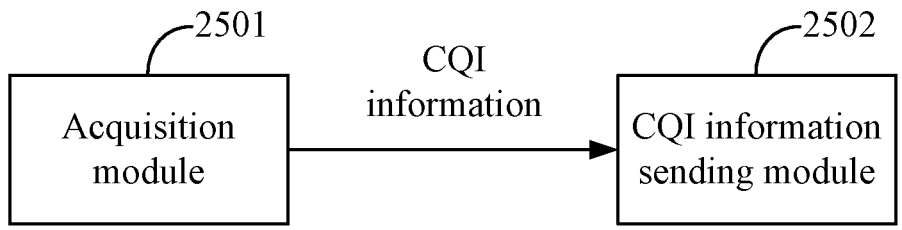
FIG. 26 is a diagram illustrating the structure of an information sending apparatus according to another embodiment of the present application.

Referring to FIG. 26, another embodiment of the present application provides a feedback information sending apparatus. The apparatus includes an acquisition module 2501 and a CQI information sending module 2502.

The acquisition module 2501 is configured to acquire channel quality indicator (CQI) information according to at least one of a repeated transmission factor R or a repeated transmission mode.

The CQI information sending module is configured to send the CQI information.

In this embodiment of the present application, the repeated transmission mode includes one of the modes below.

R layer groups correspond to R spatial-domain resources.

The R layer groups correspond to R frequency-domain resource groups, and an intersection between different frequency-domain resource groups is empty.

The R layer groups correspond to R time-domain resource groups, and an intersection between different time-domain resource groups is empty.

R repeated transmissions correspond to a redundancy version (RV) sequence.

Data channels corresponding to the R layer groups include repeated transmission of same information. R is a positive integer greater than 1.

The R layer groups or one piece of the CQI information corresponds to at least one of A channel state information reference signal (CSI-RS) resources; A pieces of rank indicator (RI) information; A pieces of precoder matrix indicator (PMI) information; A quasi co-location reference signal sets, where the A quasi co-location reference signal sets may also be referred to as A TCI states, and one TCI state includes one quasi co-location reference signal set; or A column groups of one PMI, where one column of one PMI matrix corresponds to one layer.

A is equal to 1, or A is equal to R.

In this embodiment of the present application, the repeated transmission factor R satisfies at least one of the features below.

In the case where R is greater than 1, one piece of transmission information is repeatedly transmitted on R resources.

In the case where R is equal to 1, the one piece of transmission information is not repeatedly transmitted.

The R resources correspond to at least one of R time-domain resources, R spatial-domain resources, R frequency-domain resources, R reference signal (RS) resources, R quasi co-location reference signal (RS) sets, R RVs, R scrambling sequences or R layer groups.

In this embodiment of the present application, the CQI information is acquired according to at least one of the repeated transmission factor or the repeated transmission mode. This transmission scheme is closer to the actual PDSCH transmission scheme, thereby enabling the CQI to be fed back more accurately, improving the spectral efficiency and reducing interference. Moreover, the implementation complexity of a base station is reduced. This is because the base station does not need to calculate the CQI actually used in PDSCH transmission based on the CQI fed back by a terminal. In this calculation process, different implementation algorithms between the base station and the terminal lead to inaccurate calculation.

Another embodiment of the present application provides a feedback information sending apparatus. The apparatus includes a processor and a computer-readable storage medium. The computer-readable storage medium stores instructions which, when executed by the processor, cause the processor to perform any preceding feedback information sending method.

Another embodiment of the present application provides a computer-readable storage medium. The computer-readable storage medium stores a computer program which, when executed by a processor, causes the processor to perform the steps of any preceding feedback information sending method.

In the NR protocol of the related art, when no dedicated PUCCH resource is configured, a PUCCH resource is calculated according to a CCE. Since system information block (SIB) messages notified by SSBs are consistent, CORESET0, search spaces (SSs) 0 and common PUCCH resources corresponding to two TRPs are the same. Especially when there is no ideal backhaul between the two TRPs, if the two TRPs send a PDCCH on CORESET0 independently of each other, PUCCH resources of HARQ-ACKs of PDSCHs scheduled by PDCCHs of different TRPs may collide.

Another embodiment of the present application provides an information determination method. The method includes at least one of the steps below.

Synchronization signal blocks (SSBs) corresponding to one physical cell identifier (ID) are divided into E SSB groups, where E is a positive integer.

At least one of the following information is acquired according to an SSB group index: an uplink control channel resource where hybrid automatic repeat request acknowledgement (HARQ-ACK) information is located, a physical random access channel (PRACH) resource, or timing advance (TA) information.

In this embodiment of the present application, the uplink control channel resource is acquired according to the SSB group index in the following manner.

One uplink control channel resource is selected from the uplink control channel resource group corresponding to the SSB group. Different SSB group indexes correspond to different uplink control channel resource groups.

In this embodiment of the present application, different SSB group indexes correspond to different uplink control channel resource groups in the manner below.

A frequency-domain resource and/or time-domain resource intersection between different uplink control channel resource groups corresponding to different SSB groups is empty.

This embodiment of the present application enables independent scheduling of a user based on the SSB group index.

Embodiment Six

In this embodiment, synchronization signal blocks (SSBs)/physical broadcast channels (PBCHs) in one physical cell are divided into multiple groups. Further, at least one of the following enhancements may be performed.

Figure 27:
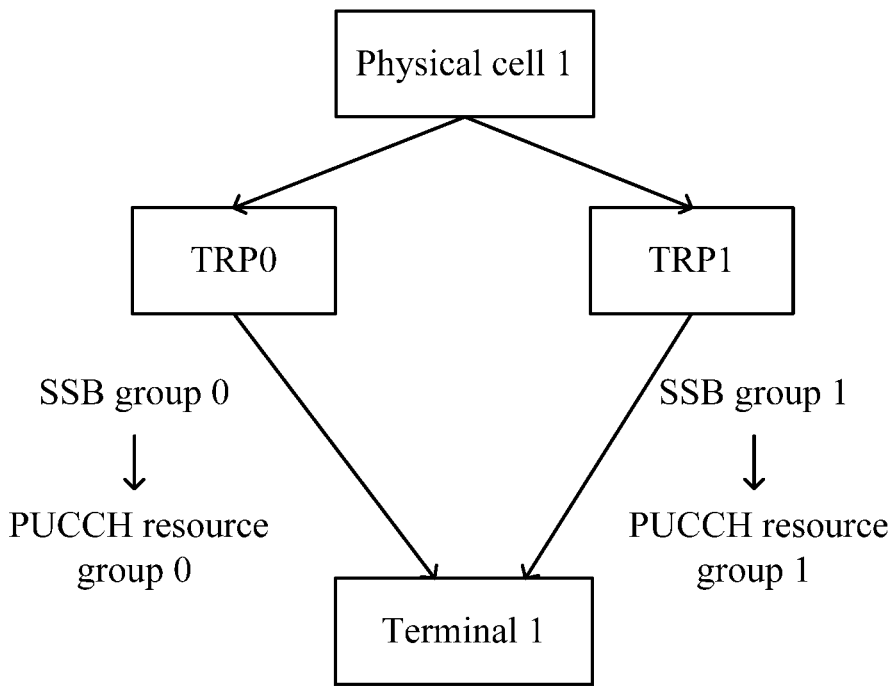
FIG. 27 is a diagram illustrating that different SSB groups of one physical cell correspond to different PUCCH resources according to an embodiment of the present application.

Enhancement 1: An SSB group index is introduced in the acquisition of a PUCCH resource. In the NR protocol of the related art, when no dedicated PUCCH resource is configured, a PUCCH resource is calculated according to a CCE. Since system information block (SIB) messages notified by SSBs are consistent, CORESET0, search spaces (SSs) 0 and common PUCCH resources corresponding to two TRPs are the same. Especially when there is no ideal backhaul between the two TRPs, if the two TRPs send a PDCCH on CORESET0 independently of each other, PUCCH resources of HARQ-ACKs of PDSCHs scheduled by PDCCHs of different TRPs may collide. To enable the two TRPs to schedule a user independently of each other, it is feasible to classify SSBs into multiple groups and introduce an SSB group index in the acquisition of a PUCCH resource so that two SSB group indexes correspond to different PUCCH resources. For example, a frequency-domain resource and/or time-domain resource intersection between different PUCCH resource groups corresponding to different SSB groups is empty. That is, two common PUCCH resource groups are available and correspond to two TRPs. As shown in FIG. 27, different SSB groups of one physical cell correspond to different PUCCH resources, and HARQ-ACKs of PDSCHs scheduled by PDCCHs in CORESET0/SS0 in different SSB groups are fed back in one PUCCH resource that is selected from their respective PUCCH resource groups. In one embodiment, SIB messages notified in different SSB groups are the same, but time-domain resources and/or frequency-domain resources occupied by different PUCCH resource groups are acquired according to SSB group indexes, or the SIB messages notified in different SSB groups may be different.

Enhancement 2: Acquisition parameters of a physical random access channel (PRACH) resource include an SSB group index so that different TRPs correspond to different PRACH resource information.

Enhancement 3: When a terminal selects an SSB, the terminal may select one SSB from each SSB group of two SSB groups. When a preamble is sent, the preamble is sent on a PRACH resource corresponding to only one SSB. msg3 further includes an SSB index selected from another SSB.

Enhancement 4: One SSB group corresponds to one piece of TA information. Different SSB groups correspond to different pieces of TA information.

In the preceding scheme, SSB group index information may be carried in DMRS sequence information of a PBCH, or SSB group information may be notified in a PBCH/SIB.

Another embodiment of the present application provides an information determination apparatus. The apparatus includes at least one of a grouping module or an information acquisition module.

The grouping module is configured to divide synchronization signal blocks (SSBs) corresponding to one physical cell ID into E SSB groups. E is a positive integer.

The information acquisition module is configured to acquire at least one of an uplink control channel resource where a hybrid automatic repeat request acknowledgement (HARQ-ACK) is located, a physical random access channel (PRACH) resource or timing advance (TA) information according to an SSB group index.

In this embodiment of the present application, the uplink control channel resource is acquired according to the SSB group index in the following manner.

One uplink control channel resource is selected from the uplink control channel resource group corresponding to the SSB group. Different SSB group indexes correspond to different uplink control channel resource groups.

In this embodiment of the present application, different SSB group indexes correspond to different uplink control channel resource groups in the manner below.

A frequency-domain resource and/or time-domain resource intersection between different uplink control channel resource groups corresponding to different SSB groups is empty.

Another embodiment of the present application provides an information determination apparatus. The apparatus includes a processor and a computer-readable storage medium. The computer-readable storage medium stores instructions which, when executed by the processor, cause the processor to perform any preceding information determination method.

Another embodiment of the present application provides a computer-readable storage medium. The computer-readable storage medium stores a computer program which, when executed by a processor, causes the processor to perform the steps of any preceding information determination method.

Another embodiment of the present application provides a monitoring occasion determination method. The method includes determining, according to a synchronization signal block (SSB) index corresponding to at least one quasi co-location reference signal set configured or activated for a control resource set CORESET0, a monitoring occasion of a downlink control channel scrambled by a cell radio network temporary identifier (C-RNTI) in CORESET0.

Embodiment Seven

In this embodiment, more than one quasi co-location reference signal set, such as more than one TCI state, is configured or activated for CORESET0. Each TCI state includes one quasi co-location reference signal set. According to the SSB index corresponding to the more than one quasi co-location reference signal set, the monitoring occasion of a PDCCH scrambled by a cell radio network temporary identifier (C-RNTI) in CORESET0 is determined. For example, the monitoring occasion of CORESET0 corresponding to SSBi is i. i=0, 1, . . . , 63. When two SSBs {SSB1, SSB4} are configured or activated for CORESET0, a terminal monitors, only on monitoring occasion 1 and monitoring occasion 4, the PDCCH scrambled by the C-RNTI. When one SSB {SSB52} is configured or activated for CORESET0, the terminal monitors, only on monitoring occasion 52, the PDCCH scrambled by the C-RNTI.

Further, the SSB indexes that has a QCL relationship with the CSI-RS/SSB associated with type-D included in the more than one TCI state are different. Quasi co-location reference signals associated with different quasi co-location parameters in one TCI state and a same SSB index satisfy a QCL relationship with respect to the corresponding quasi co-location parameters.

Further, the SSB index corresponding to the TCI state/quasi co-location reference signal set is the SSB index satisfying the QCL relationship with the quasi co-location reference signals in the TCI state/quasi co-location reference signal set.

More than one quasi co-location reference signal set is configured for CORESET0 for the terminal so that the terminal can detect a control channel in CORESET0 corresponding to more SSBs, thereby improving the resource utilization of CORESET0 (for example, idle CORESET0 can be used for transmission of a dedicated control channel) and improving the performance of a dedicated control channel and/or a common control channel.

An embodiment of the present application provides a monitoring occasion determination apparatus. The apparatus includes a monitoring occasion determination module configured to determine, according to a synchronization signal block (SSB) index corresponding to at least one quasi co-location reference signal set configured or activated for a control resource set CORESET0, a monitoring occasion of a downlink control channel scrambled by a cell radio network temporary identifier (C-RNTI) in CORESET0.

Another embodiment of the present application provides a monitoring occasion determination apparatus. The apparatus includes a processor and a computer-readable storage medium. The computer-readable storage medium stores instructions which, when executed by the processor, cause the processor to perform any preceding monitoring occasion determination method.

Another embodiment of the present application provides a computer-readable storage medium. The computer-readable storage medium stores a computer program which, when executed by a processor, causes the processor to perform the steps of any preceding monitoring occasion determination method.

Embodiment Eight

In this embodiment, the transmission information as a whole included in one transport block (TB) does not correspond to one cyclic redundancy check (CRC) but is divided into multiple code blocks (CBs). Each CB has a CRC. The CBs are channel coded, cascaded, modulated and then transmitted. In this manner, when Ultra-Reliable Low-Latency Communications (URLLC) information comes during the transmission of enhanced Mobile Broadband (eMBB) traffic, some of the code block groups (CBGs) in the eMBB can be replaced by CBGs of the new URLLC traffic. In this case, if all the CBGs are correctly transmitted, there is no need for repeated transmission. If the one TB as a whole has one more CRC in addition to the one CRC in each CB of the TB, the CRC of the TB as a whole fails after the CBGs of the new URLLC traffic replace some of the eMBB traffic, and a terminal feeds back a NACK, leading to repeated transmission of all the data.

Further, it is feasible to determine whether the transmission information included in the one TB as a whole has one CRC or not according to signaling information and/or a predetermined rule.

According to the preceding scheme, not only the one TB can include both the URLLC traffic data and the eMBB traffic data and the DCI load can be reduced, but also the suddenly coming URLLC traffic data can be allowed to be inserted into one CBG of the eMBB traffic.

Embodiment Nine

In this embodiment, the power difference between a DMRS and a PDSCH is determined according to antenna group information and/or TCI group information. Whether the power difference between the DMRS and the PDSCH is determined according to CSI-RS information is determined according to the antenna group information and/or the TCI group information.

Further, if the group information including the CSI-RS and the DMRS/PDSCH satisfies a predetermined condition, then the power difference between the DMRS and the PDSCH may be determined according to the number of REs occupied by the CSI-RS in one OFDM symbol. In one OFDM symbol, the greater the number of REs occupied by the CSI-RS satisfying the condition, the greater the power difference between the DMRS and the PDSCH.

Further, the time-domain symbol where the CSI-RS is located does not include the DMRS.

Further, the CSI-RS includes at least one of a non-zero power CSI-RS (NZP-CSI-RS), a zero power CSI-RS (ZP-CSI-RS) or an interference measurement CSI-IM resource.

Further, the group information is the group information that includes the reference signal and that is included in the TCI state corresponding to the CSI-RS and the DMRS/PDSCH; or the group information is information about the transmitting antenna group or the receiving antenna group corresponding to the CSI-RS and the DMRS/PDSCH.

The group information including the CSI-RS and the DMRS/PDSCH satisfies the predetermined condition in one of the following manners: The CSI-RS and the DMRS/PDSCH are in the same group; or the CSI-RS and the DMRS/PDSCH are in different groups.

When the transmitting antennas of the CSI-RS and the DMRS/PDSCH are different, the DMRS/PDSCH cannot be sent on the REs occupied by the CSI-RS on the transmitting antenna of the DMRS/PDSCH, and the transmitted power on these REs can be used for power enhancement of the DMRS/PDSCH, and therefore, not only the transmitted power is substantially equal in different time-domain symbols, but also the reception performance of the DMRS/PDSCH is improved.

Embodiment Ten

In this embodiment, a terminal reports the supported maximum number of TCI state groups including TCI states activated for a PDSCH in one BWP, where the TCI state groups are configured through MAC-CE signaling from a base station. For example, in the case where different TCI state groups correspond to different TRPs or different receiving antennas of the terminal, the more TCI state groups are activated, the more receiving antennas the terminal needs to activate, and the greater the power consumption of the terminal is. The terminal reports this capability information to the base station.

It is to be understood by those having ordinary skill in the art that some or all steps of the preceding method and function modules/units in the preceding system or apparatus may be implemented as software, firmware, hardware and suitable combinations thereof. In the hardware implementation, the division of the preceding function modules/units may not correspond to the division of physical components. For example, one physical component may have multiple functions, or one function or step may be performed jointly by several physical components. Some or all physical components may be implemented as software executed by a processor such as a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). As is known to those having ordinary skill in the art, the term computer storage media include volatile and non-volatile as well as removable and non-removable media implemented in any method or technology for storing information (such as computer-readable instructions, data structures, program modules or other data). The computer storage media include, but are not limited to, a random-access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storages, a magnetic cassette, a magnetic tape, a magnetic disk or other magnetic storage devices, or any other medium for storing desired information that can be accessed by a computer. Moreover, as is known to those having ordinary skill in the art, the communication media generally include computer-readable instructions, data structures, program modules, or other data in carriers or in

What is claimed is:

1. An information determination method performed by a wireless communication device, comprising:
  receiving a signaling message comprising first information and second information, wherein:
    the first information comprises a downlink control channel resource group identifier (ID);
    the second information comprises a table of a transmission configuration indicator (TCI) indication field value corresponding to downlink control information (DCI); and
    the second information corresponds to the first information;
  determining, according to the second information, whether hybrid automatic repeat request acknowledgement (HARQ-ACK) codebooks corresponding to the first information with different indexes are combined; and
  in response to determining that the HARQ-ACK codebooks corresponding to the first information with the different indexes are combined:
    connecting, according to the different indexes, the HARQ-ACK codebooks corresponding to the different indexes,
    inputting the connected HARQ-ACK codebook to a channel encoder,
    encoding the connected HARQ-ACK codebook, and
    feeding back the encoded HARQ-ACK codebook in one uplink control resource.

2. The information determination method according to claim 1, wherein:
  the TCI indication field value being 1 indicates a corresponding TCI state being activated; and
  the TCI indication field value being 0 indicates the corresponding TCI state being deactivated.

3. The information determination method according to claim 1, wherein:
  the signaling message comprises a medium access control-control element (MAC-CE) command.

4. The information determination method according to claim 1, wherein:
  the downlink control channel resource group comprises one or more control resource sets (CORESET).

5. The information determination method according to claim 1, wherein connecting, according to the different indexes, the HARQ-ACK codebooks corresponding to the different indexes comprises:
  in response to the first information being with two indexes, connecting the HARQ-ACK codebook corresponding to the first information with index 0 followed by the HARQ-ACK codebook corresponding to the first information with index 1.

6. A wireless communication device comprising:
  a memory storing instructions; and
  a processor in communication with the memory, wherein, when the processor executes the instructions, the processor is configured to cause the wireless communication device to:
  receiving a signaling message comprising first information and second information, wherein:
    the first information comprises a downlink control channel resource group identifier (ID);
    the second information comprises a table of a transmission configuration indicator (TCI) indication field value corresponding to downlink control information (DCI); and
    the second information corresponds to the first information;
  determining, according to the second information, whether hybrid automatic repeat request acknowledgement (HARQ-ACK) codebooks corresponding to the first information with different indexes are combined; and
  in response to determining that the HARQ-ACK codebooks corresponding to the first information with the different indexes are combined:
    connecting, according to the different indexes, the HARQ-ACK codebooks corresponding to the different indexes,
    inputting the connected HARQ-ACK codebook to a channel encoder,
    encoding the connected HARQ-ACK codebook, and
    feeding back the encoded HARQ-ACK codebook in one uplink control resource.

7. The wireless communication device according to claim 6, wherein:
  the TCI indication field value being 1 indicates a corresponding TCI state being activated; and
  the TCI indication field value being 0 indicates the corresponding TCI state being deactivated.

8. The wireless communication device according to claim 6, wherein:
  the downlink control channel resource group comprises one or more control resource sets (CORESET).

9. The wireless communication device according to claim 6, wherein, when the processor is configured to cause the wireless communication device to connect, according to the different indexes, the HARQ-ACK codebooks corresponding to the different indexes, the processor is configured to cause the wireless communication device to:
  in response to the first information being with two indexes, connect the HARQ-ACK codebook corresponding to the first information with index 0 followed by the HARQ-ACK codebook corresponding to the first information with index 1.

* * * * *